US012569862B2

(12) United States Patent
Maxwell

(10) Patent No.: US 12,569,862 B2

(45) Date of Patent: Mar. 10, 2026

(54) CENTRIFUGES AND RELATED METHODS OF USE TO DEWATER MATURE (FLUID) FINE TAILINGS

(71) Applicant: Sentrimax Centrifuges Inc., Edmonton (CA)

(72) Inventor: Thomas J. Maxwell, Edmonton (CA)

(73) Assignee: SENTRIMAX CENTRIFUGES INC., Edmonton (CA)

( * ) Notice: Subject to any disclaimer, the term of this patent is extended or adjusted under 35 U.S.C. 154(b) by 770 days.

(21) Appl. No.: 17/525,861

(22) Filed: Nov. 12, 2021

(65) Prior Publication Data

US 2023/0149950 A1 May 18, 2023

(51) Int. Cl.
*B04B 1/20* (2006.01)

(52) U.S. Cl.
CPC ........ *B04B 1/20* (2013.01); *B04B 2001/2033* (2013.01); *B04B 2001/2041* (2013.01); *B04B 2001/205* (2013.01)

(58) Field of Classification Search
None
See application file for complete search history.

(56) References Cited

U.S. PATENT DOCUMENTS

| | | | | |
|---|---|---|---|---|
| 3,428,246 | A | 2/1969 | Finkelston | |
| 3,723,310 | A | 3/1973 | Lang et al. | |
| 4,298,160 | A * | 11/1981 | Jackson | C02F 1/385 494/37 |
| 5,342,279 | A | 8/1994 | Cooperstein | |
| 5,354,255 | A * | 10/1994 | Shapiro | B04B 1/20 494/53 |
| 5,449,464 | A | 9/1995 | El-Shall | |
| 5,935,425 | A | 8/1999 | Sortwell | |
| 6,187,581 | B1 | 2/2001 | Sicotte et al. | |
| 9,028,387 | B2 | 5/2015 | Eiken | |
| 2003/0228966 | A1* | 12/2003 | Koch | B04B 1/20 494/53 |
| 2004/0035800 | A1 | 2/2004 | Weir | |
| 2008/0026175 | A1* | 1/2008 | Bloch | F16C 33/103 428/66.6 |
| 2008/0035577 | A1 | 2/2008 | Brook-Levinson et al. | |
| 2009/0020458 | A1 | 1/2009 | Bozak et al. | |
| 2010/0038314 | A1 | 2/2010 | Vion et al. | |
| 2011/0094970 | A1 | 4/2011 | Kincaid et al. | |
| 2011/0147316 | A1 | 6/2011 | Polizzotti et al. | |
| 2012/0049669 | A1* | 3/2012 | Garriga | H02K 9/12 310/59 |
| 2012/0248042 | A1 | 10/2012 | Baldrey et al. | |
| 2014/0054231 | A1 | 2/2014 | Spence et al. | |
| 2021/0054881 | A1* | 2/2021 | Caspall | F16C 33/36 |

FOREIGN PATENT DOCUMENTS

| | | |
|---|---|---|
| CA | 2068905 | 7/1997 |
| CA | 2286209 | 10/1998 |
| CA | 2175859 | 10/2001 |
| CA | 2257706 | 5/2002 |
| CA | 2735640 | 10/2012 |
| CA | 2787607 | 2/2014 |
| CA | 2932188 | 12/2017 |
| EP | 0177838 | 4/1986 |
| FR | 2057600 | 5/1971 |
| WO | 01/92167 | 12/2001 |
| WO | 2012088291 | 6/2012 |

OTHER PUBLICATIONS

Alfa Laval, Lynx 1000 Decanter Centrifuge for Tailings Treatment, Available as early as 2015, 2 pages.
Drilling Mud Cleaning system, retrieved Mar. 25, 2016 from http://www.dccleaningsystem.com/tag/drillin ••mud•centrifuge/, 12 pages.
Machine generated translation of EP0177838 (FP3), 4 pages.
Machine generated translation of FR2057600 (FP4), 7 pages.
Excerpts from Decanter Centrifuge Handbook, First Edition, available as early as Feb. 1, 2001, 23 pages.
Kyte Centrifuge, Model: P-95000 Details, retrieved Mar. 22, 2016, appears to be available as early as Nov. 2010, 11 pages.
Bell et el., Experimental and computational analysis of the feed accelerator for a decanter centrifuge, Journal of Process Mechanical Engineering, published Jun. 20, 2014, 15 pages, vol. 230, Issue 2.

* cited by examiner

*Primary Examiner* — Krishnan S Menon
*Assistant Examiner* — Tak L Chiu
(74) *Attorney, Agent, or Firm* — Robert A. Nissen

(57) ABSTRACT

Accelerators and conveyor bodies for a decanter centrifuge are discussed. A decanter centrifuge may have a bowl forming a sedimentation chamber with a cake discharge and a centrate discharge; a screw conveyor within the sedimentation chamber, the screw conveyor having a conveyor body and a flight, the conveyor body defining a feed chamber; and an accelerator within the feed chamber for increasing the angular velocity of a feed mixture prior to entering the sedimentation chamber, the accelerator comprising an impeller with plural vanes, the plural vanes being releasably mounted to the conveyor body and sized to pass through an axial end of the conveyor body.

20 Claims, 14 Drawing Sheets

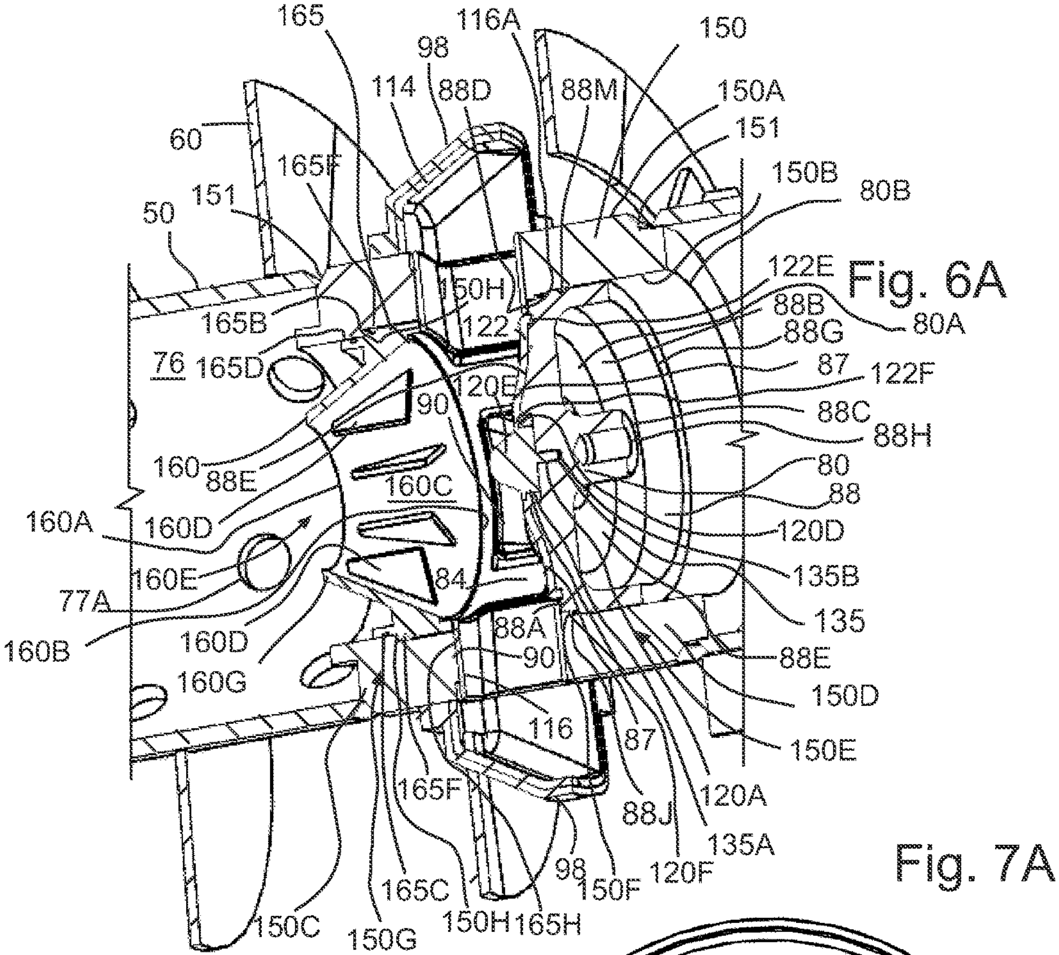
Fig. 6A
Fig. 7A
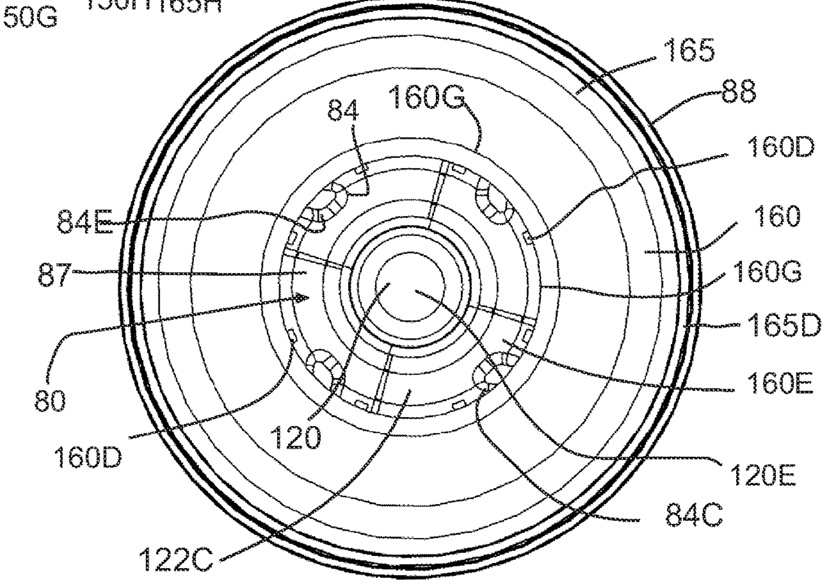

Fig. 7B
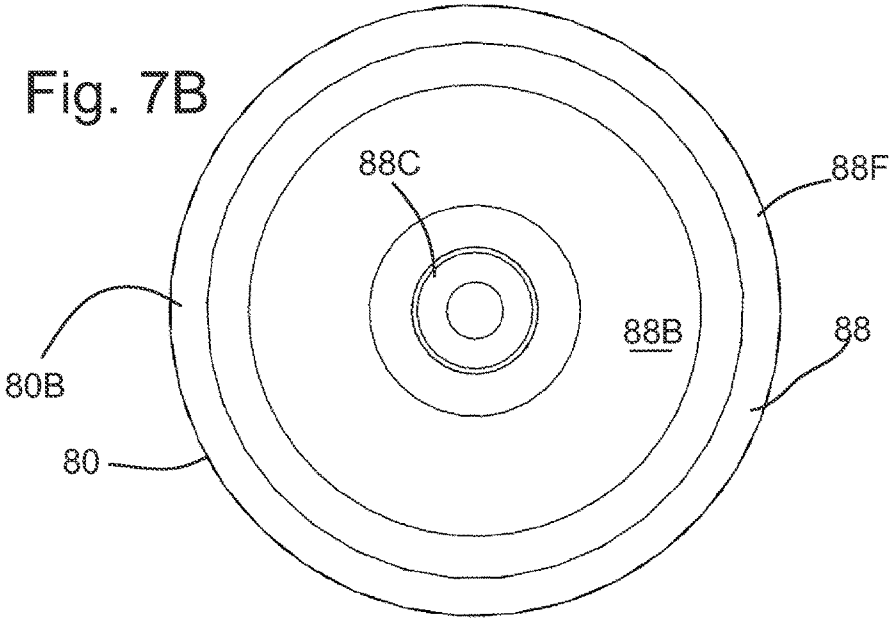
Fig. 8A1
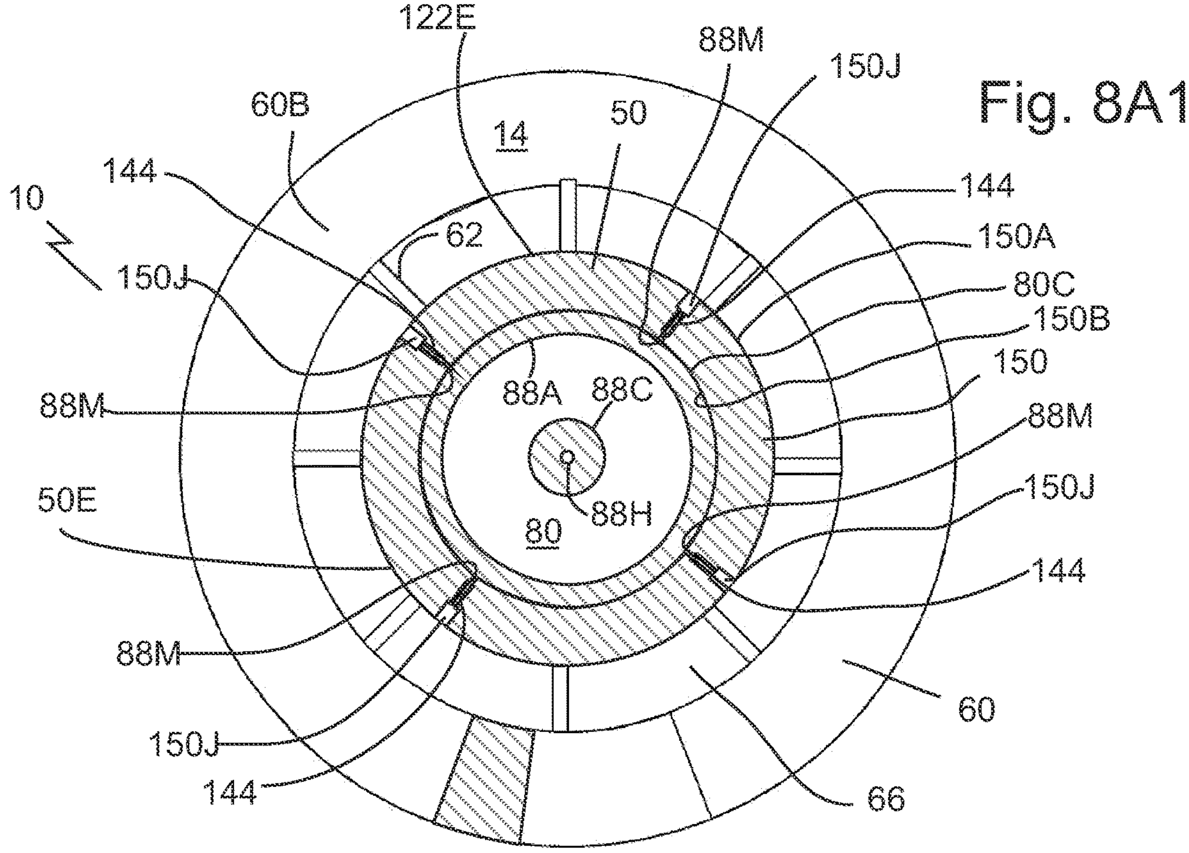

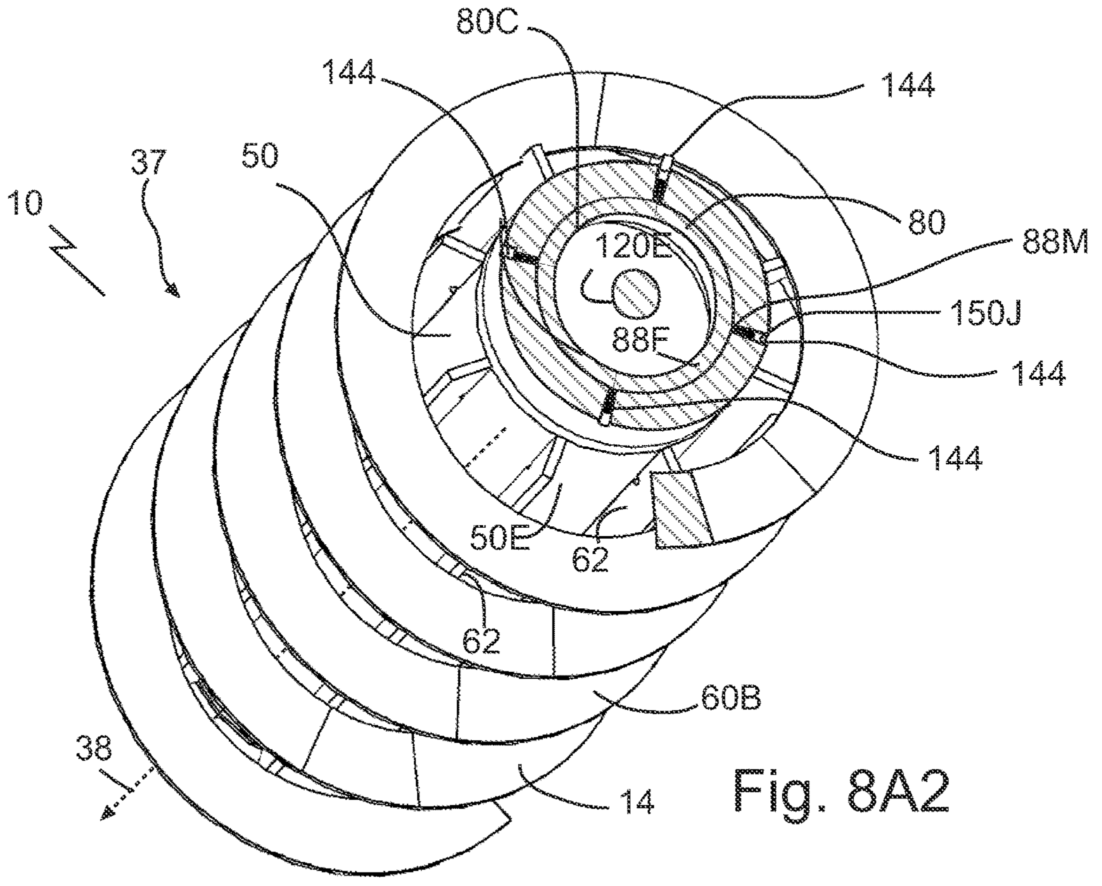
Fig. 8A2
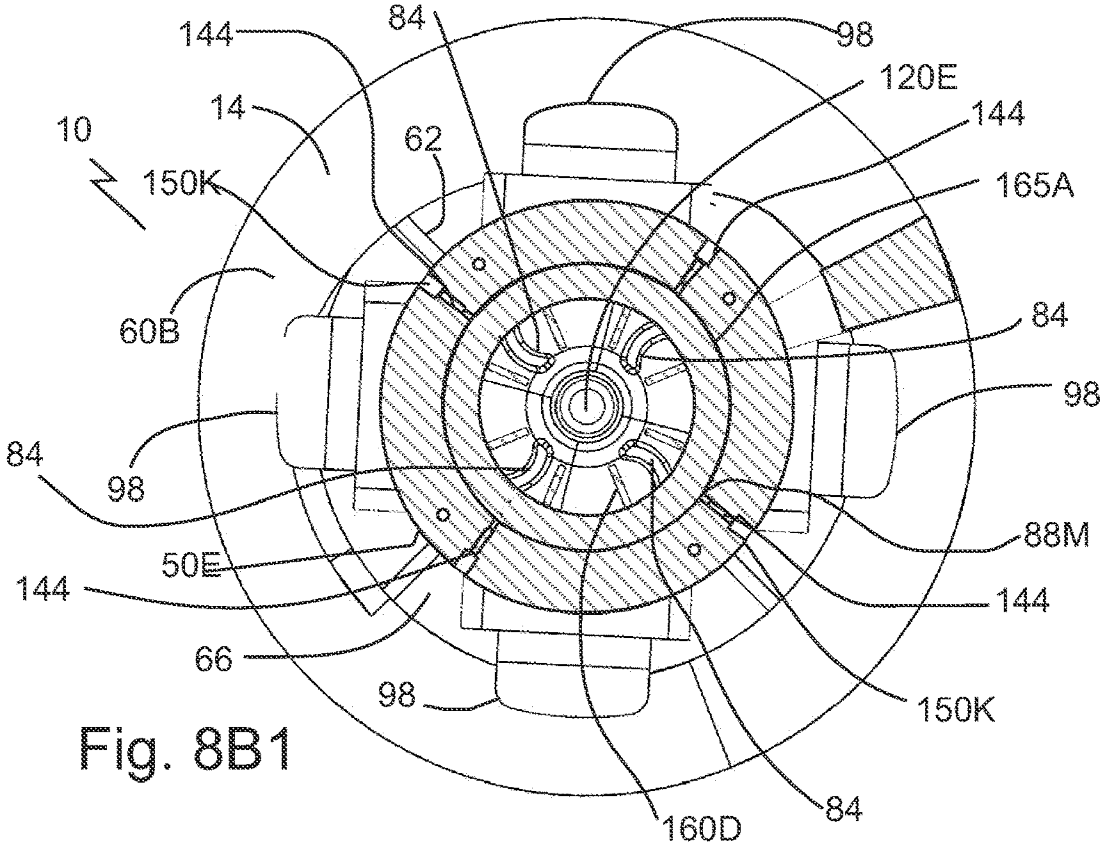
Fig. 8B1

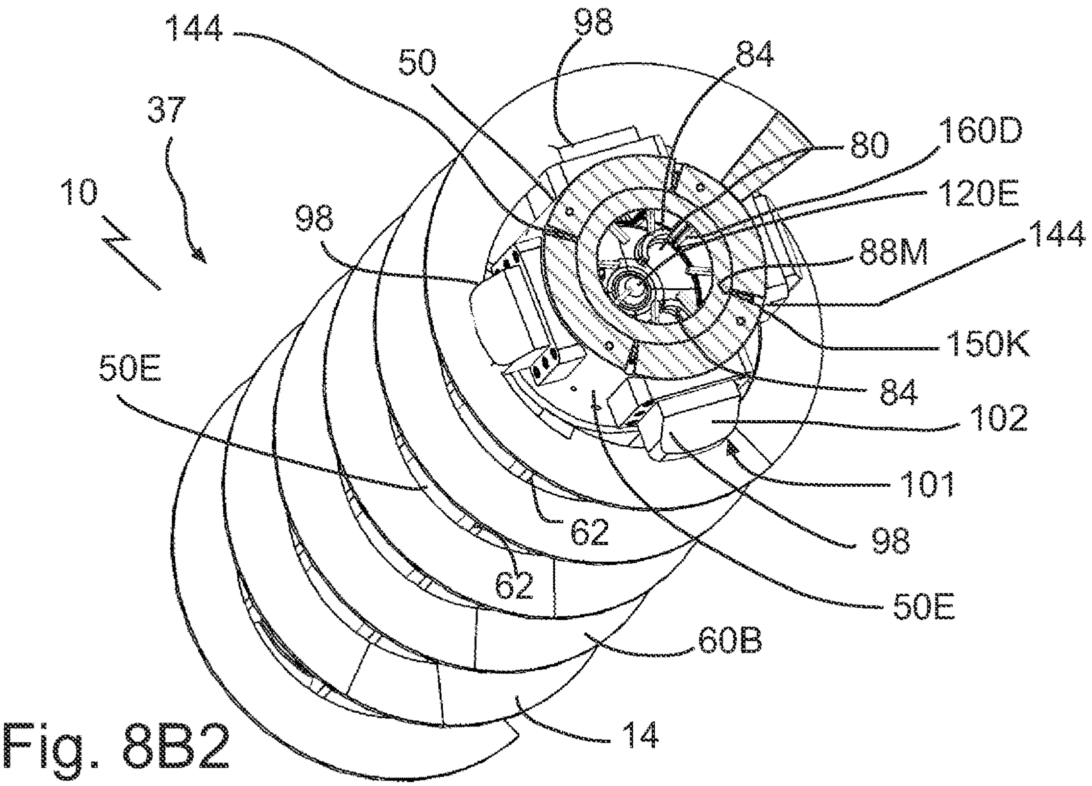
Fig. 8B2
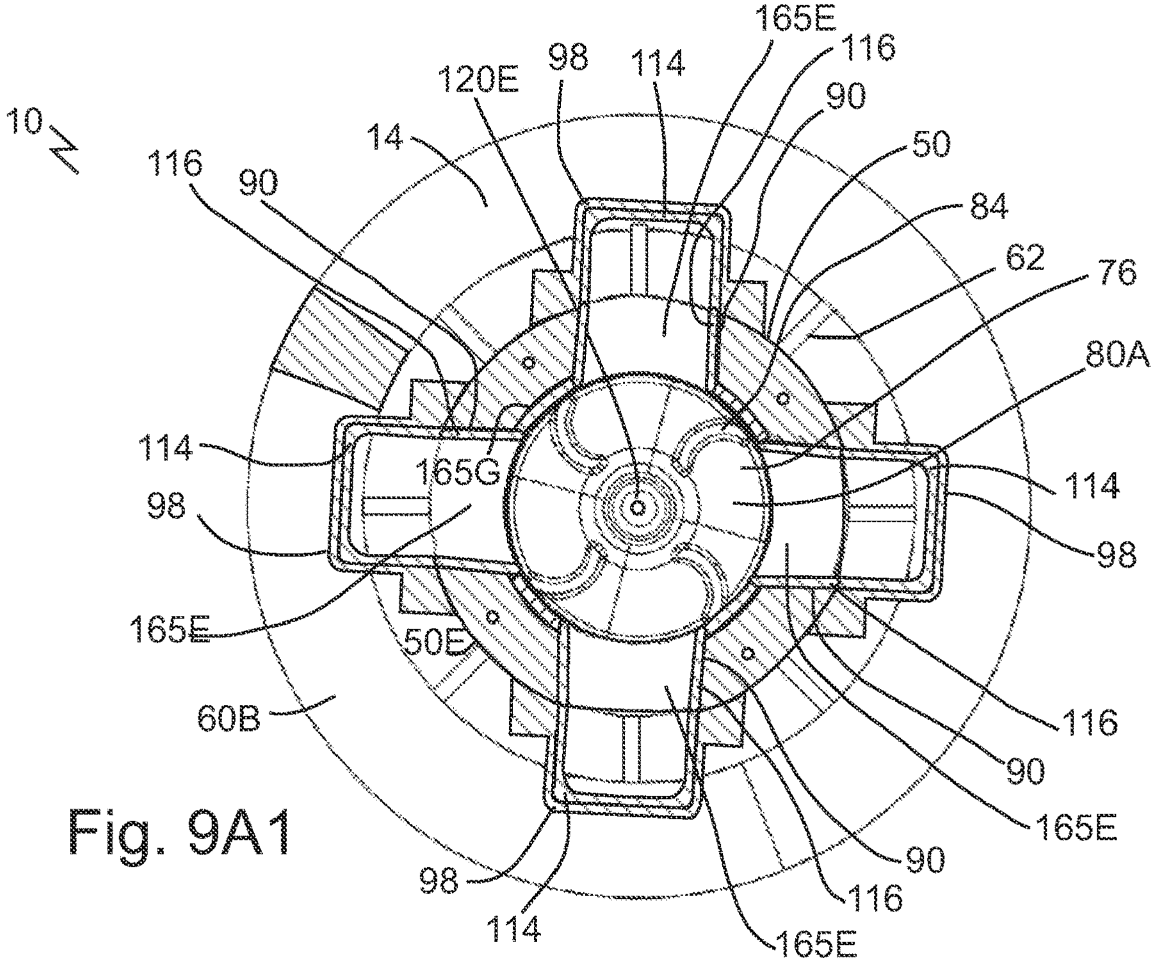
Fig. 9A1

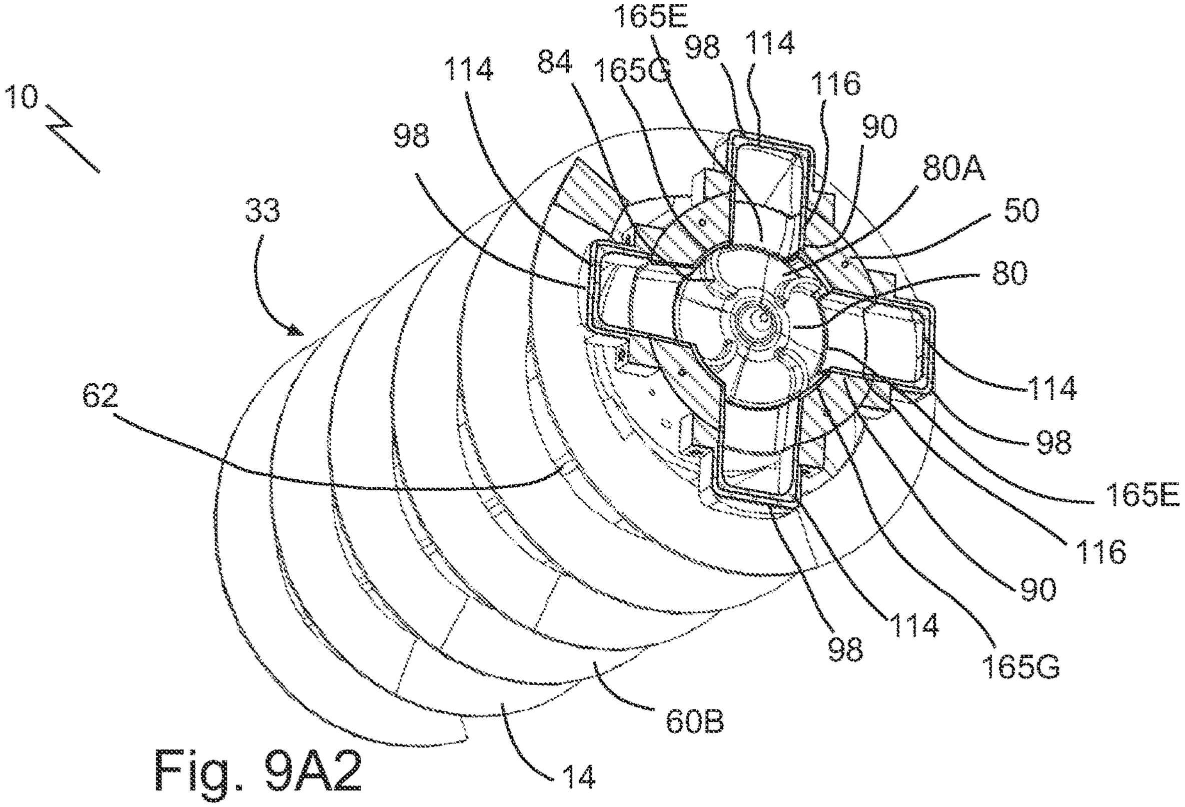
Fig. 9A2
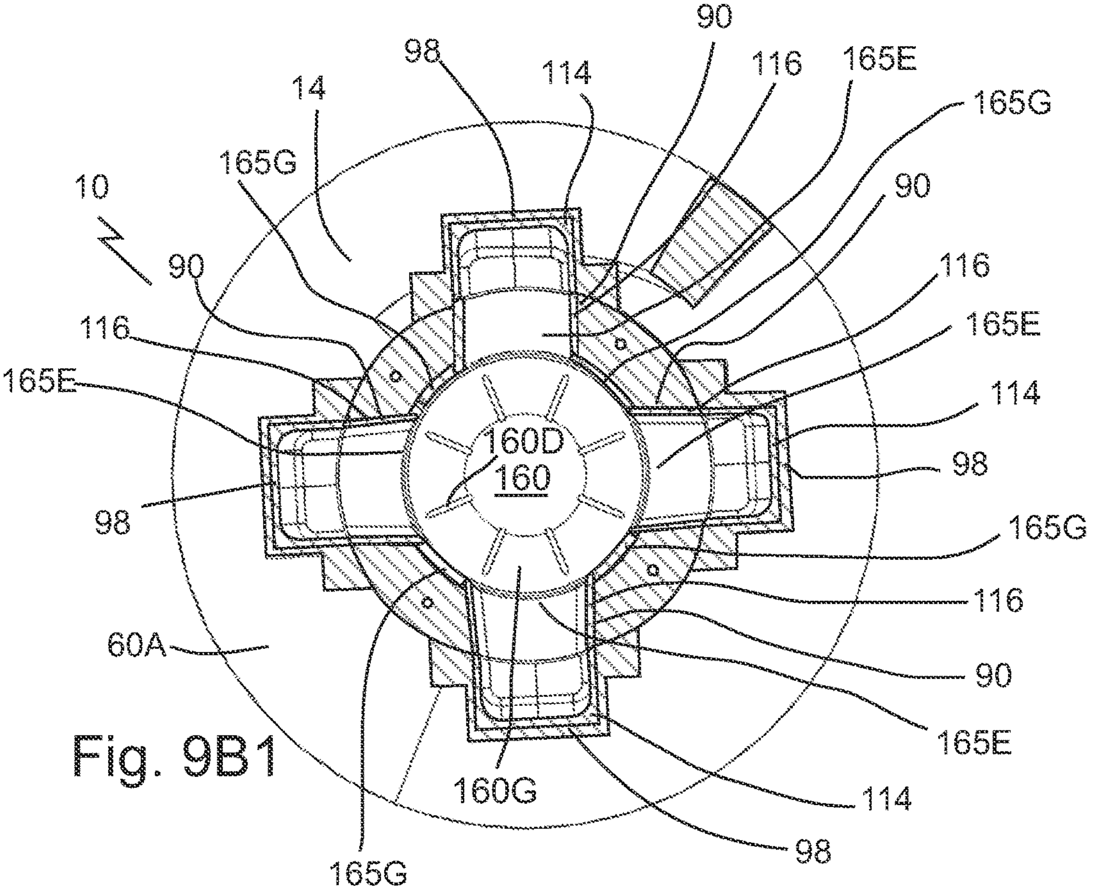
Fig. 9B1

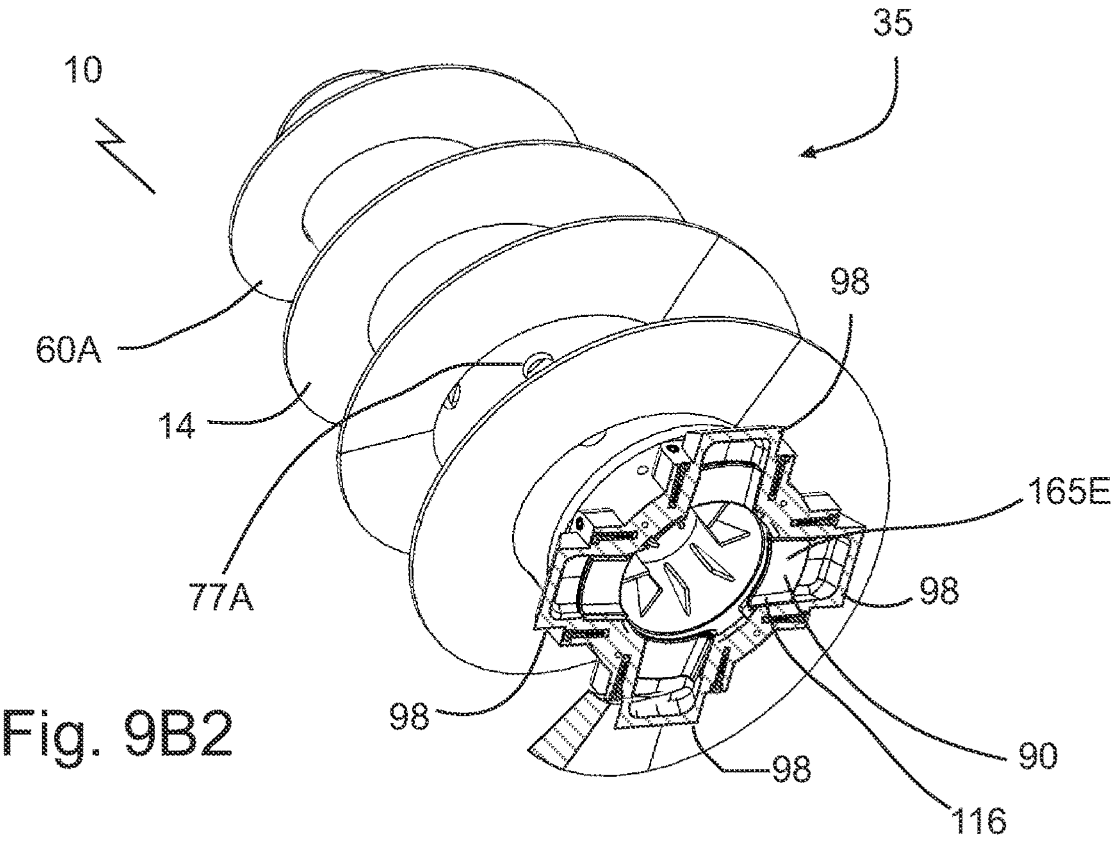
Fig. 9B2
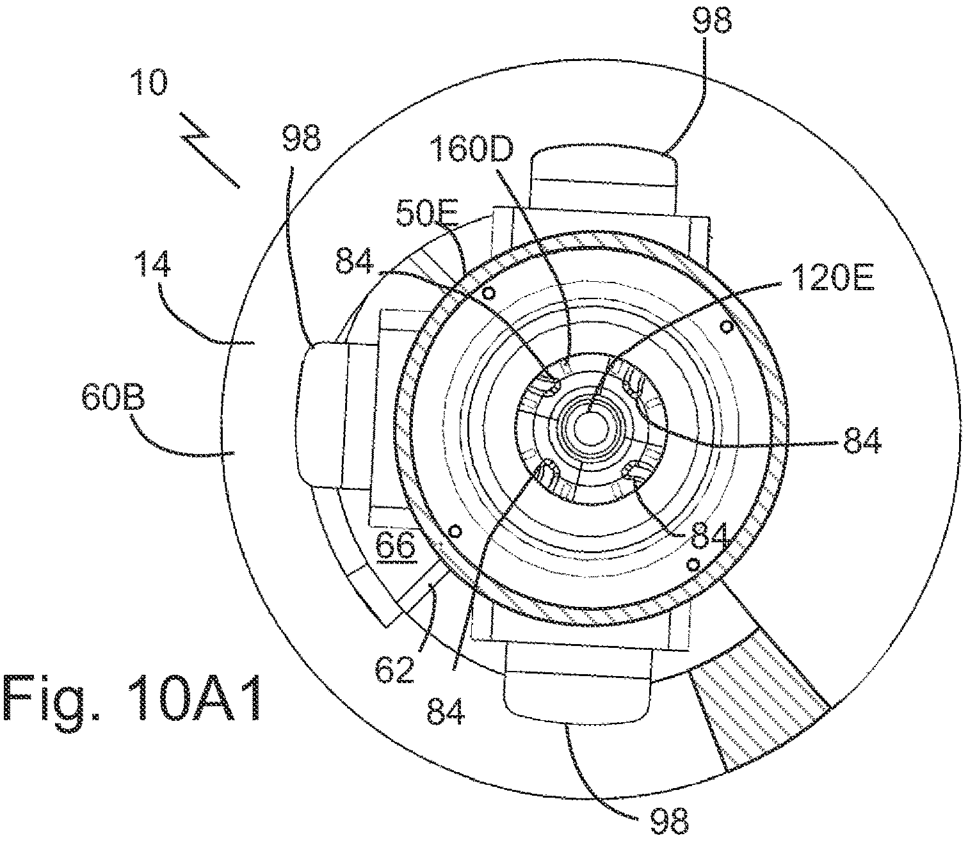
Fig. 10A1

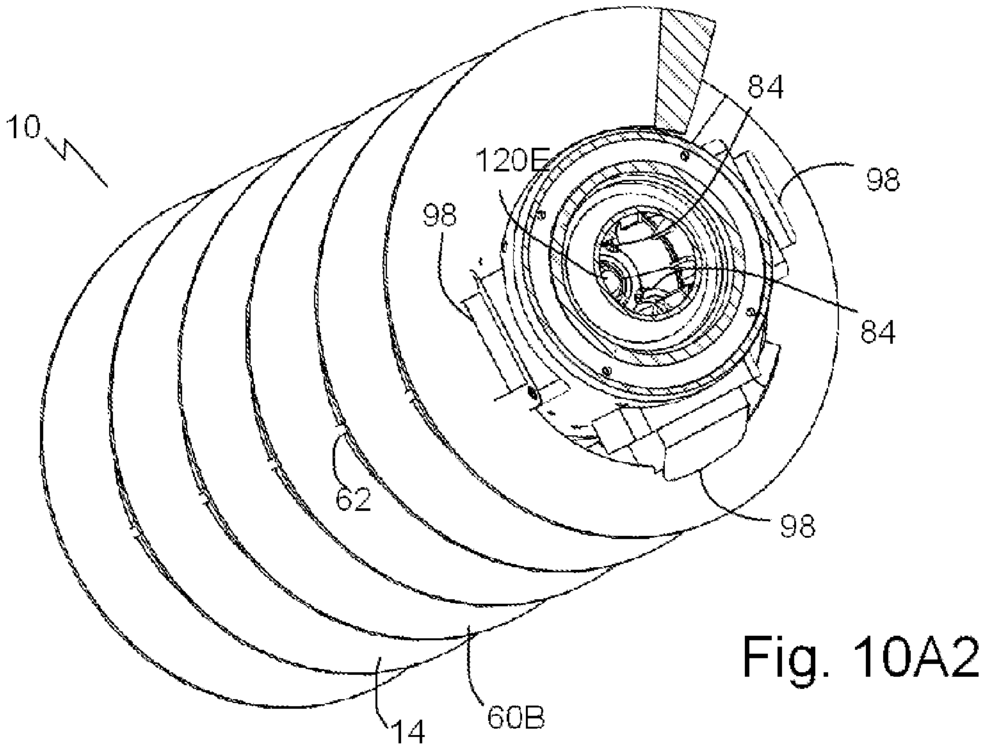
Fig. 10A2
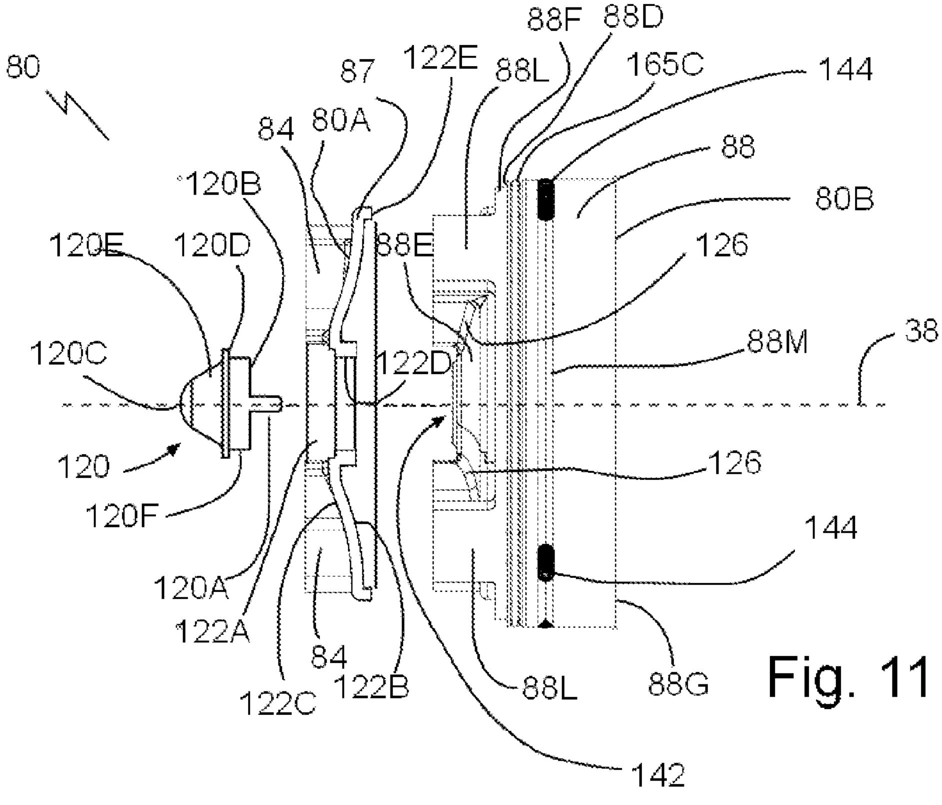
Fig. 11

CENTRIFUGES AND RELATED METHODS OF USE TO DEWATER MATURE (FLUID) FINE TAILINGS

TECHNICAL FIELD

This document relates to decanter centrifuges and related methods of use, for example to dewater mature fine tailings (MFT), also known as fluid fine tailings (FFT).

BACKGROUND

Decanter centrifuges such as the ALFA LAVAL™ LYNX 1000™ are used to dewater oil sands tailings. The LYNX 1000™ has a radial feed discharge, a conical beach, a cylindrical pond, and a solid flighting conveyor.

SUMMARY

Decanter centrifuges are disclosed, including accelerators and conveyor bodies for a decanter centrifuge.

A decanter centrifuge may comprise: a bowl forming a sedimentation chamber with a cake discharge and a centrate discharge; a screw conveyor within the sedimentation chamber, the screw conveyor having a conveyor body and a flight, the conveyor body defining a feed chamber; and an accelerator within the feed chamber for increasing the angular velocity of a feed mixture prior to entering the sedimentation chamber, the accelerator comprising an impeller with plural vanes, the plural vanes being releasably mounted to the conveyor body and sized to pass through an axial end of the conveyor body.

A method is also disclosed of operating and repairing a decanter centrifuge the method comprising: operating the decanter centrifuge to continuously process a feed mixture therein, the decanter centrifuge having a bowl and a screw conveyor, the bowl forming a sedimentation chamber with a cake discharge and a centrate discharge, the feed mixture comprising solids and liquids, operating comprising: supplying the feed mixture through a feed conduit into a feed chamber formed by a conveyor body of the screw conveyor; using an accelerator within the feed chamber to direct the feed mixture into the sedimentation chamber via radial ports in the conveyor body, the accelerator comprising an impeller with plural vanes; rotating the bowl and the conveyor body to effect at least a partial phase separation of the solids and liquids of the feed mixture; and discharging solids through the cake discharge, and discharging liquids through the centrate discharge; releasing the plural vanes from the conveyor body and passing the plural vanes out of an axial end of the conveyor body; installing a second set of plural vanes in the conveyor body by passing the second set of plural vanes through the axial end of the conveyor body, and mounting the second set of plural vanes to the conveyor body; and operating the decanter centrifuge to continuously process the feed mixture.

A decanter centrifuge is disclosed comprising: a bowl forming a sedimentation chamber with a cake discharge and a centrate discharge; a screw conveyor within the sedimentation chamber, the screw conveyor having a conveyor body and a flight, the conveyor body defining a feed chamber; and an accelerator within the feed chamber for increasing the angular velocity of a feed mixture prior to entering the sedimentation chamber, the accelerator comprising an impeller with plural vanes, in which the plural vanes are forwardly curved.

Decanter centrifuges are disclosed. In one case a decanter centrifuge is disclosed for the purpose of dewatering MFTs. The centrifuge may comprise an accelerator. The centrifuge may have an axial flow passage within conveyor flighting. The centrifuge may have redirection nozzles connected to the feed chamber, as a package for economically processing large volumes of MFTs. In some cases, only part of a decanter centrifuge is provided, for example an accelerator, or a conveyor body, with or without a bowl.

A decanter centrifuge is disclosed comprising: a bowl forming a sedimentation chamber with a cake discharge and a centrate discharge; a screw conveyor within the sedimentation chamber, the screw conveyor having a conveyor body and a flight, the conveyor body defining a feed chamber; a feed conduit connected to supply a feed mixture of solids and liquids to the feed chamber; a radial port in the conveyor body to direct the feed mixture from the feed chamber to the sedimentation chamber; and a flocculant conduit structured to supply a flocculant to the sedimentation chamber.

A method of operating a decanter centrifuge is disclosed the method comprising: supplying the feed mixture through a feed conduit into a feed chamber formed by a conveyor body of the screw conveyor; directing the feed mixture from the feed chamber into the sedimentation chamber through a radial port in the conveyor body; supplying a flocculant through a flocculant conduit into the sedimentation chamber; rotating the bowl and the conveyor body to effect at least a partial phase separation of the solids and liquids of the feed mixture; and discharging solids through the cake discharge, and discharging liquids through the centrate discharge.

A decanter centrifuge may be provided having a conveyor design with; 1) an inlet or feed chamber in which rotational energy may be applied to the feed slurry before the feed flows through the inlet apertures and discharges into the space between the conveyor body and the internal side of the bowl where the separation of the solid constituents is achieved, 2) a part that redirects the feed flow direction towards the liquid end hub as it discharges from the inlet into the space between the conveyor body and the bowl wall. And 3) window ports are cut into the flighting or the flighting is modified such that it is elevated on posts to provide a space for the redirected flow of the feed to travel unimpeded axially towards the liquid end hub between the conveyor tube body and the top of the flights. The feed flow is now travelling axially towards the liquid end hub with a relatively reduced velocity, a relatively reduced turbulence and a more laminar flow pattern. Such structure is expected to provide for relatively less turbulent flow than in a centrifuge such as the LYNX 1000™ that has solid flighting and no redirection nozzles. The stated structure is expected to allow for greatly improved settling of the suspended solids in the feed, and to minimize shear and hence reducing polymer/flocculant dosage and centrifuge rotating assembly maintenance requirements.

Redirection nozzles may be fastened, for example bolted, over inlets (feed zone discharge) to redirect the flow ninety degrees with respect to the feed zone from a radial direction to an axial flow direction in the sedimentation chamber towards the pond hub (clarification section) of the bowl. Such a configuration may reduce turbulence that would otherwise be caused by the influent being introduced radially from the feed zone and heading axially directly toward the bowl wall. Such is expected to eliminate or reduce wear occurring on the conical section. The caulk strips on the bowl extension may have a longer life as well. Conventional larger bowl machines such as the LYNX 1000™ incorporate solid flighting, axial feed ports into the sedimentation chamber, and limited to no means for increasing the angular velocity of the feed mixture prior to supply into the sedimentation chamber, and are used for municipal waste streams. By contrast, MFTs have been found to exhibit excessive wear on conventional centrifuges, thus requiring frequent servicing, decreased clarification, and increased polymer costs.

In various embodiments, there may be included any one or more of the following features. The plural vanes are formed on a disc part that has a maximum outer diameter smaller than a minimum inner diameter of the axial end of the conveyor body. The axial end of the conveyor body is a first axial end opposite an axial feed end of the conveyor body, the axial feed end comprising or defining a feed conduit into the feed chamber. The disc part is mounted to or forms an accelerator base. The disc part is adhered to the accelerator base. The disc part comprises: a ring part mounting the plural vanes; and a nose part centered within the accelerator base via a stem. The plural vanes are releasably mounted by fasteners that are accessible from an exterior of the conveyor body. The accelerator mounts within an outer collar body of the conveyor body. The fasteners extender through radial bores from an outer surface of the outer collar body to engage an outer surface of the accelerator. The fasteners comprise set screws. The fasteners engage a circumferential groove in the outer surface of the accelerator. The plural vanes are curved. The plural vanes are forwardly curved. The conveyor body is shaped to define or comprises a radial stop that forms an axial seat for the accelerator. A feed conduit connected to supply a feed mixture of solids and liquids to the feed chamber formed within the conveyor body; and radial feed redirection nozzles that are structured to direct the feed mixture from the feed chamber toward the flight along an outer surface of the conveyor body. The screw conveyor defines an axial flow passage between the conveyor body and a radially inward facing edge of the flight; and the feed redirection nozzles direct the feed mixture to the axial flow passage. The feed redirection nozzles are in communication with the feed chamber via respective radial ports in the outer surface of the conveyor body. Wear liners in the radial ports, the wear liners that form an axial seat for the accelerator. A feed zone liner within the feed chamber upstream of the accelerator. The feed zone liner comprises a ring part that defines an axial feed port to direct feed to the plural vanes of the accelerator. The ring part comprises guide fins arrayed about the axial feed port. The feed zone liner is releasably mounted to the conveyor body and sized to pass through an axial end of the conveyor body. The feed zone liner defines a maximum outer diameter smaller than a minimum inner diameter of the axial end of the conveyor body. The feed zone liner is releasably mounted by fasteners that are accessible from an exterior of the conveyor body. The feed zone liner mounts within an outer collar body of the conveyor body. The fasteners extender through radial bores from an outer surface of the outer collar body to engage an outer surface of the feed zone liner. The fasteners engage a circumferential groove in the outer surface of the feed zone liner. A flocculant conduit structured to supply a flocculant to the sedimentation chamber. An oil bath bearing assembly supporting one or more axial ends of the decanter centrifuge. The oil bath bearing assembly comprises a bearing that has a race and a roller element. The roller element comprises a spherical roller. The bearing is a double-row spherical roller bearing. A pillow block supporting the bearing; and pillow block covers sealing first and second axial ends of the pillow block, in which interior surfaces of the pillow block covers and the pillow block define a bearing-receiving cavity in which the bearing and bearing fluid are disposed. A bearing fluid injector connected to a bearing fluid supply system. The bearing fluid injector comprises nozzles arranged at least partially circumferentially about an inner annular surface of one or both pillow block covers and oriented to direct bearing fluid toward an axial end of the bearing. The oil bath bearing assembly comprises one of more flinger rings adjacent one or more axial ends of the bearing and sloped with decreasing radius in a direction toward the bearing to direct bearing fluid toward the bearing. The conveyor body defines overflow ports to an outer surface of the conveyor body to increase the rate of solid discharge. The overflow ports are circular in cross section. The feed mixture comprising mature fine tailings produced from an oil sands process. Supplying the feed mixture from a tailings pond, in which the feed mixture comprises mature fine tailings produced from an oil sands process. Flocculating the feed mixture prior to supplying the feed mixture through the feed conduit. The nozzle is mounted over an outer surface of the conveyor body, with the nozzle communicating with the feed chamber via a port in the conveyor body. The nozzle defines a hood that forms an elbow-shaped flow passage that connects the port to an axially facing nozzle opening defined by the hood. An outer diameter of the redirection hood is smaller than an inner diameter of the flight. The cake discharge is at or near a first axial end of the bowl, the centrate discharge is at or near a second axial end of the bowl, and the nozzle is structured to direct the feed mixture toward the second axial end of the bowl. The axial flow passage defines an axial flow path that extends from the nozzle to the second axial end. The bowl comprises a conical beach section defining the first axial end and a cylindrical pond section defining the second axial end, and the flight forms a windowless helix whose inner edge is fused to the conveyor body continuously along a length of the flight throughout the beach section. Plural nozzles radially spaced around the feed chamber. The flight is helically mounted to an outer surface of the conveyor body via a plurality of radial posts such that the helical flight is radially spaced from the conveyor body to define the axial flow passage. A replaceable wear liner is internally mounted to the nozzle to protect the nozzle from abrasion from the feed mixture. The feed chamber is defined between axially spaced plates mounted within the conveyor body. An accelerator within the feed chamber for increasing the angular velocity of the feed mixture prior to entering the sedimentation chamber. The accelerator comprises an impellor with plural vanes. The feed conduit is connected to supply feed mixture to the feed chamber through a port in a first axial end wall of the feed chamber, and the impellor is fixed to a second axial end wall of the feed chamber. The nozzle, or a port that supplies the nozzle and is defined in the outer surface of the conveyor body, is located radially outward of the impellor in a plane, perpendicular to a centrifuge axis, defined by the impellor. The feed chamber comprises a plurality of lobes radially spaced from one another about the second axial end wall within the feed chamber to define a radial feed passage to the nozzle. The radial feed passage has side walls defined by the plurality of lobes and the side walls each mount a replaceable wear liner. A drive connected to simultaneously rotate the screw conveyor and the bowl at different angular velocities relative to one another. The feed mixture comprises mature fine tailings produced from an oil sands process. The feed mixture supplied to the feed chamber comprises a flocculant. The axial flow passage is defined by a plurality of axial windows in the flight. The mature fine tailings comprise solids of 10-45% by weight of the feed mixture. Operating the decanter centrifuge to effect a phase separation of the solids and liquids in the feed mixture, and producing solids through the cake discharge, and liquids through the centrate discharge. Supplying the feed mixture from a tailings pond, in which the feed mixture comprises mature fine tailings produced from an oil sands process. The feed mixture prior is flocculated to supplying the feed mixture through the feed conduit. The decanter centrifuge is supported for rotation by oil bath bearings. A bowl forming a sedimentation chamber with a cake discharge and a centrate discharge; a screw conveyor within the sedimentation chamber, the screw conveyor having a conveyor body and a flight, the conveyor body defining a feed chamber; a feed conduit connected to supply a feed mixture of solids and liquids to the feed chamber; a radial port in the conveyor body to direct the feed mixture from the feed chamber to the sedimentation chamber; and a flocculant conduit structured to supply a flocculant to the sedimentation chamber. The feed conduit and an upstream portion of the flocculant conduit extend from an axial inlet end of the conveyor body and through an interior of the conveyor body. Axes of the feed conduit and the upstream portion of the flocculant conduit are oriented parallel with a central axis of the conveyor body. The feed conduit and the upstream portion of the flocculant conduit are coaxial with one another. The feed conduit is defined by a feed tube; and the upstream portion of the flocculant conduit is defined as an annulus defined between a flocculant tube and the feed tube. The flocculant conduit comprises radial ports in the conveyor body that are supplied by the upstream portion of the flocculant conduit. The flocculant conduit comprises a downstream portion that directs the flocculant toward the flight along an outer surface of the conveyor body. The downstream portion comprises a plurality of axial tubes along the outer surface of the conveyor body. The downstream portion extends along a beach section of the bowl to a flocculant outlet defined within a pond section of the bowl. Radial feed redirection nozzles are structured to direct the feed mixture from the feed chamber, through the radial ports in the conveyor body, and toward the flight along an outer surface of the conveyor body; and a flocculant outlet of the flocculant conduit is adjacent the feed redirection nozzles. An accelerator within the feed chamber for increasing the angular velocity of a feed mixture prior to entering the sedimentation chamber. The feed mixture comprising mature fine tailings produced from an oil sands process. To effect a phase separation of the solids and liquids in the feed mixture, and producing solids through the cake discharge, and liquids through the centrate discharge.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which:

FIG. 6A is a perspective close up of the accelerator and feed zone liner portion of the view of FIG. 3.

FIG. 7A is a front end view of the combination of FIG. 6, viewed from the 7A-7A lines of FIG. 3, illustrating primarily the feed zone liner.

FIG. 7B is a rear end view of the combination of the conveyor of FIG. 6, viewed from the 7B-7B lines of FIG. 3, illustrating primarily the accelerator.

FIG. 8A1 is a section view taken along the 8A-8A section lines in FIG. 3.

FIG. 8A2 is a perspective view of the portion of the centrifuge as shown in FIG. 8A1.

FIG. 8B1 is a section view taken along the 8B-8B section lines in FIG. 3.

FIG. 8B2 is a perspective view of the portion of the centrifuge as shown in FIG. 8B1.

FIG. 9A1 is a section view taken along the 9A-9A section lines in FIG. 3.

FIG. 9A2 is a perspective view of the portion of the centrifuge as shown in FIG. 9A1.

FIG. 9B1 is a section view taken along the 9B-9B section lines in FIG. 3.

FIG. 9B2 is a perspective view of the portion of the centrifuge as shown in FIG. 9B1.

FIG. 10A1 is a section view taken along the 10A-10A section lines in FIG. 3.

FIG. 10A2 is a perspective view of the portion of the centrifuge as shown in FIG. 10A.

FIG. 11 is an exploded view of the accelerator of FIG. 4, with only the ring part in section.

DETAILED DESCRIPTION

Figure 1:
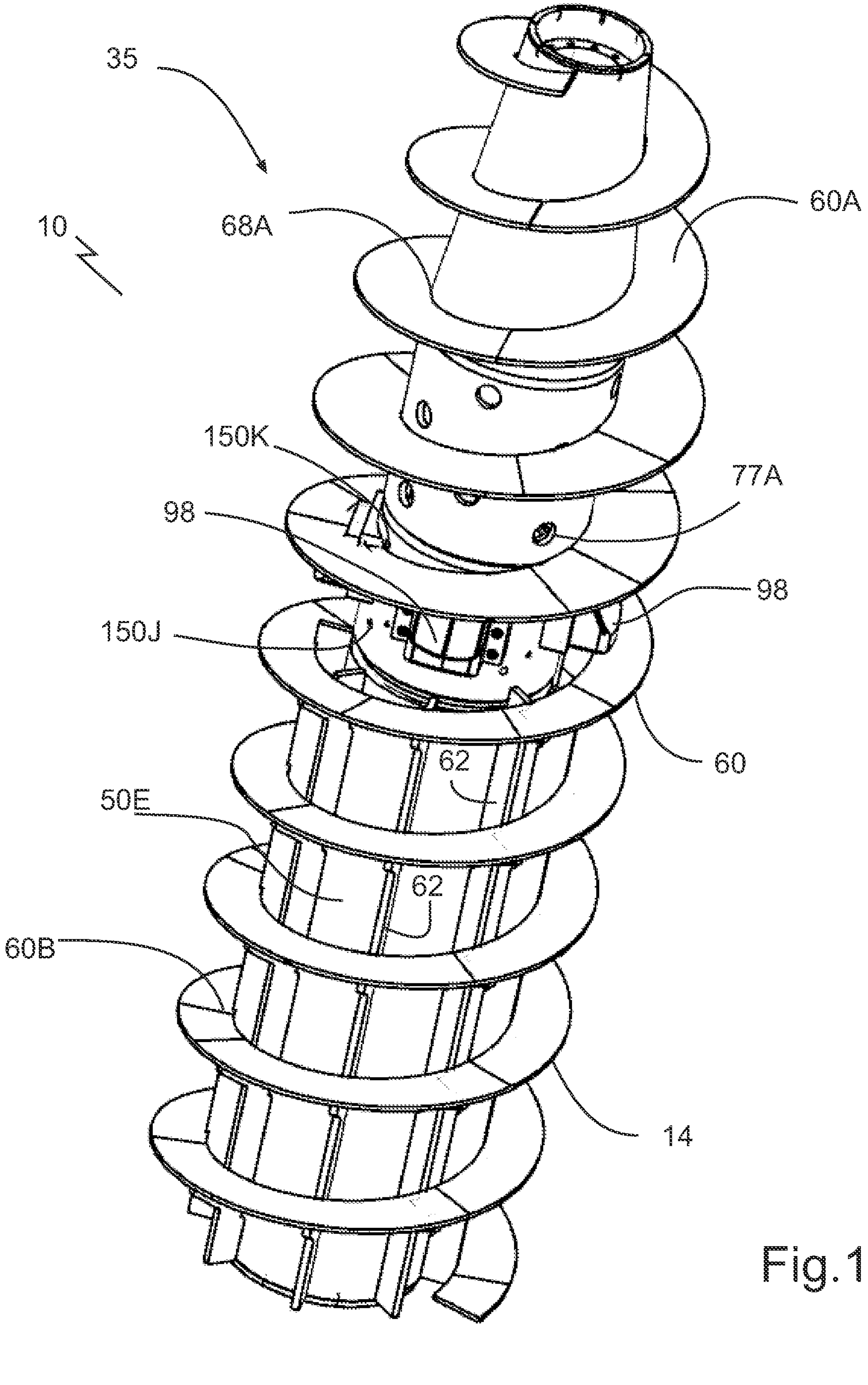
FIG. 1 is a perspective view of a conveyor for a decanter centrifuge.

Immaterial modifications may be made to the embodiments described here without departing from what is covered by the claims.

Oil sands may comprise water-wet sand grains held together by a matrix of viscous heavy oil or bitumen. The oil sands may comprise a mixture that is approximately 10% bitumen, 80% sand, and 10% fine tailings. Bitumen is a complex and viscous mixture of large or heavy hydrocarbon molecules, which may contain a significant amount of sulfur, nitrogen and oxygen. The extraction of bitumen from sand using hot water processes yields large volumes of fine tailings composed of fine silts, clays, residual bitumen and water. Fines in such mixtures include clay mineral suspensions or emulsions, predominantly kaolinite and illite.

An example fine tailings suspension has 85% water and 15% fine particles by mass. Dewatering of fine tailings occurs very slowly by gravity settling. When first discharged in ponds, the very low-density material is referred to as thin fine tailings. Oil sands tailings ponds are engineered dam and dyke systems that contain a mixture of salts, suspended solids and other dissolvable chemical compounds such as acids, benzene, hydrocarbons, residual bitumen, fine silts and water. The Syncrude Tailings Dam or Mildred Lake Settling Basin is a tailings pond that was, by volume of construction material, the largest earth structure in the world in 2001.

After a few years when the fine tailings have reached a solids content of about 30-35%, they are referred to as fluid or mature fine tailings (MFTs), which behave as a fluid-like colloidal material. The fact that MFTs behave as a fluid and have very slow consolidation rates at 1 g significantly limits options to reclaim tailings ponds. In fact, fine tailings will likely never fully settle in these tailing ponds. It is believed that the electrostatic interactions between the suspended particles, which are still partly contaminated with hydrocarbons, prevent settling from occurring. These tailing ponds have become an environmental liability for the companies responsible. A challenge facing the industry remains the removal of water from the fluid fine tailings to strengthen the deposits so that they can be reclaimed and no longer require containment. Many studies and project have been undertaken to address tailings pond remediation.

Tailings deposited in a tailings pond may contain primarily water, hydrocarbons and solids, which may include mineral material, such as rock, sand, silt and clay. The process described in this document may be useful in reclaiming these ponds by separating the liquid portion from the solid tailings, and using the separated portions to return land to its natural state. However, the apparatus and method may also be applied to any fluid having components to be separated, such as a sewage or solid-liquid mixture. The fluid to be treated may comprise tailings from deep within a tailings pond, without dilution, so long as the tailings are pumpable. If the tailings are not pumpable, they may be made pumpable by dilution with water.

Decanter centrifuges are used in the mechanical separation process of MFTs from the water in which the tailings are suspended. A centrifuge is a device that employs a high rotational speed to separate components of different densities. A decanter centrifuge separates solid materials from liquids in a slurry. The operating principle of a decanter centrifuge is based on separation via buoyancy. Naturally, a component with a higher density will fall to the bottom of a mixture, while the less dense component will be suspended above it. A decanter centrifuge increases the rate of settling through the use of continuous rotation, producing relatively high g-forces, for example forces equivalent to between 1000 to 4000 g-forces. Such acceleration reduces the settling time of the components by a large magnitude, for example permitting a mixture to settle in seconds in contrast to the same mixture settling in hours, days, years, or longer under ambient g-forces.

Through the use of decanter centrifuges, settling may be accelerated by flocculating the MFT clay particles, for example using polyacrylamides, and exposing the flocculated feed mixture to relatively high g-force in a decanter centrifuge, such as 120B0 g or higher, to effect phase separation. In such centrifuges, data suggests that the tailings feed creates internal turbulence along the length of the bowl resulting in lessened separation efficiency, increased solids caking along the pond section of the bowl, liquid influx into the beach section of the bowl, and increased wear etching and damage likely from the abrasive sand in such mixtures.

Figure 3:
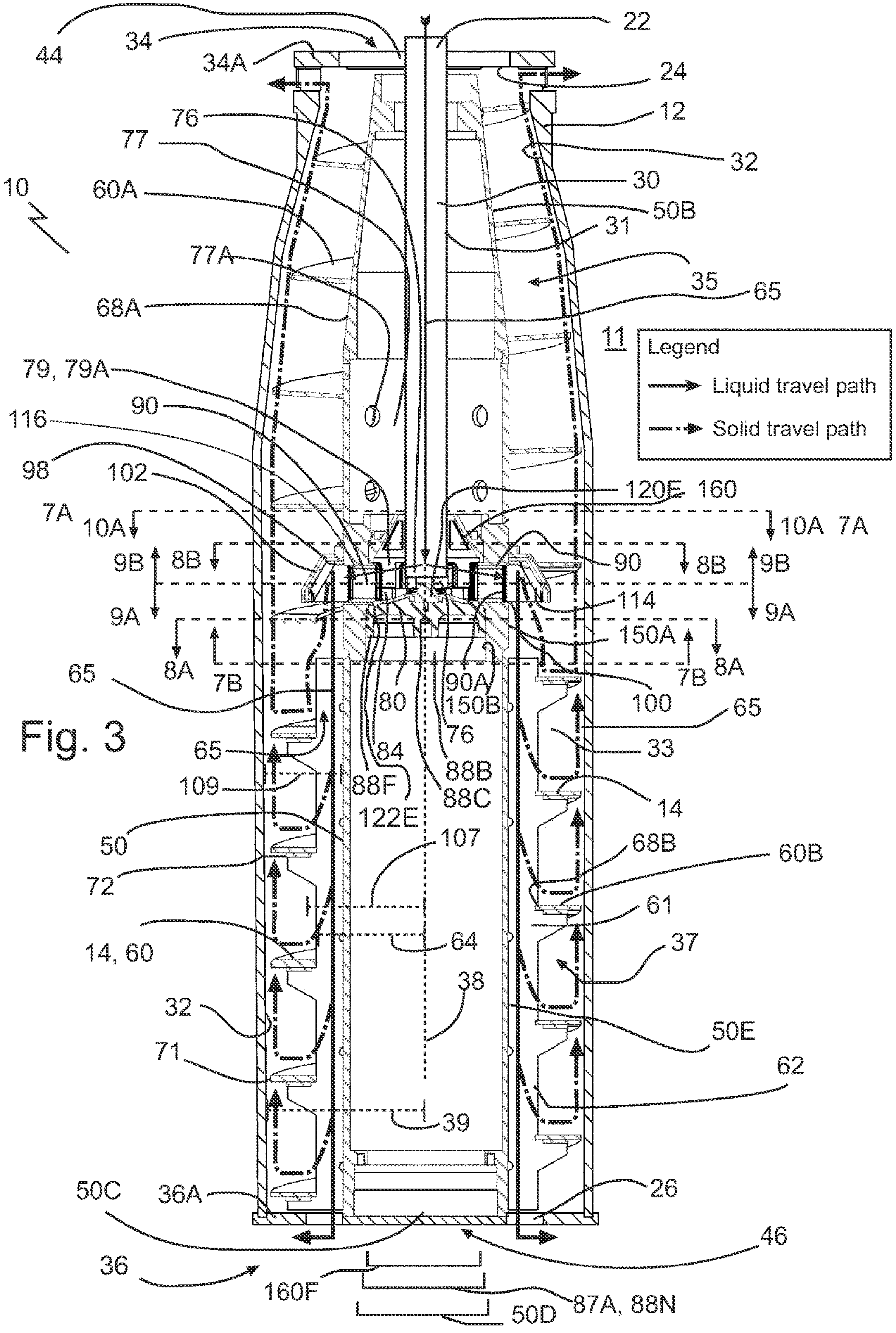
FIG. 3 is a cross-sectional view of a decanter centrifuge, which includes the conveyor of FIG. 1, and an outer bowl mounted over the conveyor, with the view taken central and parallel to the axis of the conveyor, and with lines used to illustrate the travel path of the liquid and solid mature fine tailings (MFT) in the decanter centrifuge.

Referring to FIG. 3, a decanter centrifuge 10 is illustrated, having a screw conveyor 14. The decanter centrifuge 10 may have a plurality of parts such as a screw conveyor 14 and an accelerator 80. In some cases, the centrifuge 10 has a bowl 12. The bowl 12 may in use encapsulate the decanter centrifuge 10 to house and protect the internal centrifuge parts. The screw conveyor 14 may in use be arranged in use within the sedimentation chamber 33, and may include a conveyor body 50 and a flight 60. A feed conduit 30 may be present or defined in the centrifuge 10. Referring to FIG. 3, bowl 12 may form a sedimentation chamber 33 with a cake discharge port 24 and a centrate discharge port 26. The screw conveyor 14 may be a part that conveys solid material to move towards the cake discharge port 24. The conveyor 14 may have a conveyor body 50, for example a central hub coaxial with the bowl 12 as shown in FIG. 3. The conveyor 14 may have a suitable conveying part, such as a scroll, auger, or helical flight 60. The flight 60 may be helically mounted to an outer surface of the conveyor body 50. The feed conduit 30 may be connected to supply a feed mixture of solids and liquids, for example a feed mixture of MFT, into the sedimentation chamber 33. During use, feed mixture is continually supplied to the sedimentation chamber 33 while the bowl 12 and screw conveyor 14 are rotated. Rotation imparts a centripetal settling force upon feed mixture within the sedimentation chamber 33 to effect at least a partial phase separation between the liquids and solids in the feed mixture. The bowl 12 and conveyor 14 may rotate within a suitable housing 11, and may be driven by a suitable means such as a motor with gearbox (not shown).

Referring to FIG. 3, bowl 12 and conveyor 14 may be oriented for co-current or counter-current flow, the latter of which is shown. The bowl 12 may be divided into a pond section 37, which may be a straight cylinder, and a beach section 35, which may have a conical shape, for example the shape of a truncated cone. The sedimentation chamber 33 may be defined by an internal encircling wall 32 of bowl 12, a first end plate 34A at a first axial end 34 of rotatably journaled drum or bowl 12, a second end plate 36A at a second axial end 36 of the pond section 37 of the bowl 12. Where a conveyor body 50 is present, the sedimentation chamber 33 may be defined by the space between the outer surface of the conveyor body 50 and the internal encircling wall 32 of the bowl 12.

Referring to FIG. 3, in a counter-current model as shown, the cake discharge port 24 is at or near first axial end 34, while the centrate discharge port 26 is at or near second axial end 36. The centrate discharge port 26 may be radially spaced about an axis of rotation 38. Ports 26 may be positioned to open, and hence drain liquid from, a radius 39, defined from axis 38, selected to achieve a specific pond depth 109, defined as radial distance from internal encircling wall 32, within the bowl 12. The selection of the pond depth 109 means the ports 26 act as a weir that takes off a top layer of liquid from fluids in the bowl 12. The cake discharge port 24 may be defined by the spaces between the axial projections in a ring plate 34A, for example a steel inner. The ring plate 34A may be mounted via fasteners (not shown in Figures) to an axial end 34 of the beach section 35.

Figure 2:
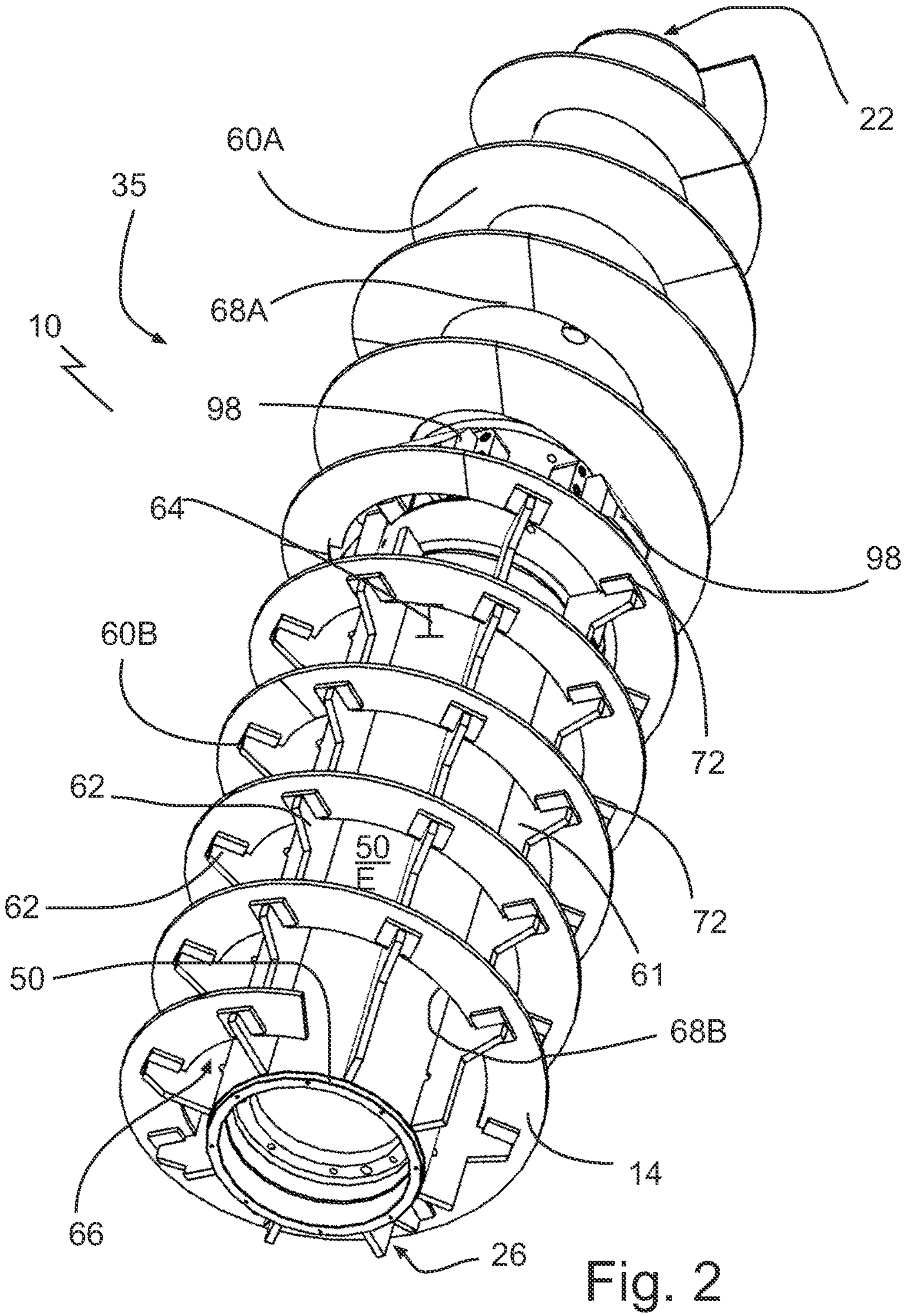
FIG. 2 is a second perspective view of the conveyor of FIG. 1.

Referring to FIGS. 1-3, the screw conveyor 14 may be structured to permit axial flow of fluids in the sedimentation chamber 33. Referring to FIGS. 3 and 9A1, 9A2, 10A1, 10A2, a feed redirection nozzle or plurality of nozzles 98 (for example distributed about axis 38) may be provided to direct feed mixture, entering the sedimentation chamber 33 from the feed conduit 30, in an axial direction, for example towards axial end 36 and/or toward the axial flow passage 65. Referring to FIGS. 3 and 9A1, 9A2, 10A1, 10A2, a feed redirection nozzle or plurality of nozzles 98 may be provided to direct feed mixture, entering the sedimentation chamber 33 from the feed conduit 30, in an axial direction, for example towards axial end 36 and/or toward the axial flow passage 65. Referring to FIG. 3, feed conduit 30 may be connected to supply the feed mixture to a feed zone or chamber 76, which may be formed within the conveyor body 50. The feed conduit 30 may be a suitable supply conduit, such as a non-rotating pipe 31 extended within and coaxial with a rotating internal cylindrical shell formed by the conveyor body 50. In some cases, the feed conduit 30 is mounted to rotate. In some cases, the feed conduit 30 is mounted to rifle the feed mixture as it passes through the conduit 30. Each nozzle 98 may be structured to receive feed mixture from the feed chamber 76 via a respective port, such as a radial port 90, in the outer surface 50E of the conveyor body 50, for example in between adjacent rows of flighting 60 as shown. Referring to FIG. 9A1, the plural nozzles 98 may be radially spaced about an outer circumference of the conveyor body, for example equidistant from one another to provide a balanced influx of feed mixture, around the feed chamber 76, for example around the conveyor body 50.

Figure 4:
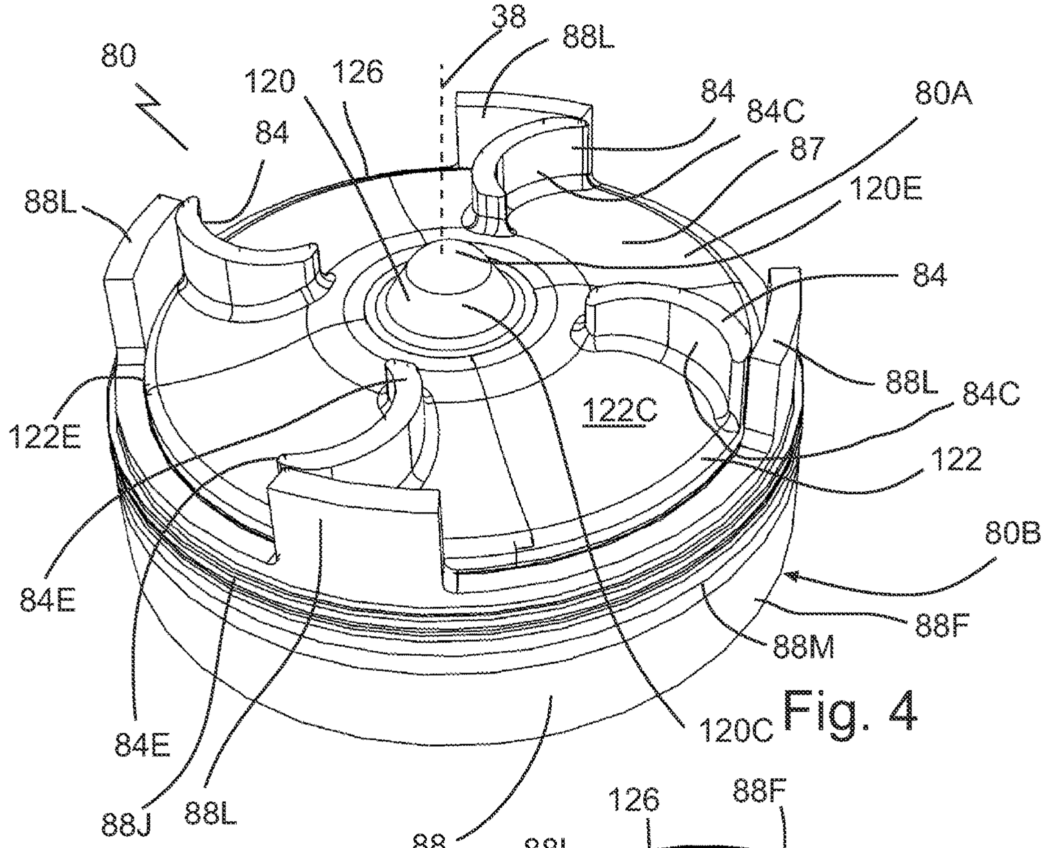
FIG. 4 is a perspective view of an accelerator of the conveyor of FIG. 1.
Figure 5:
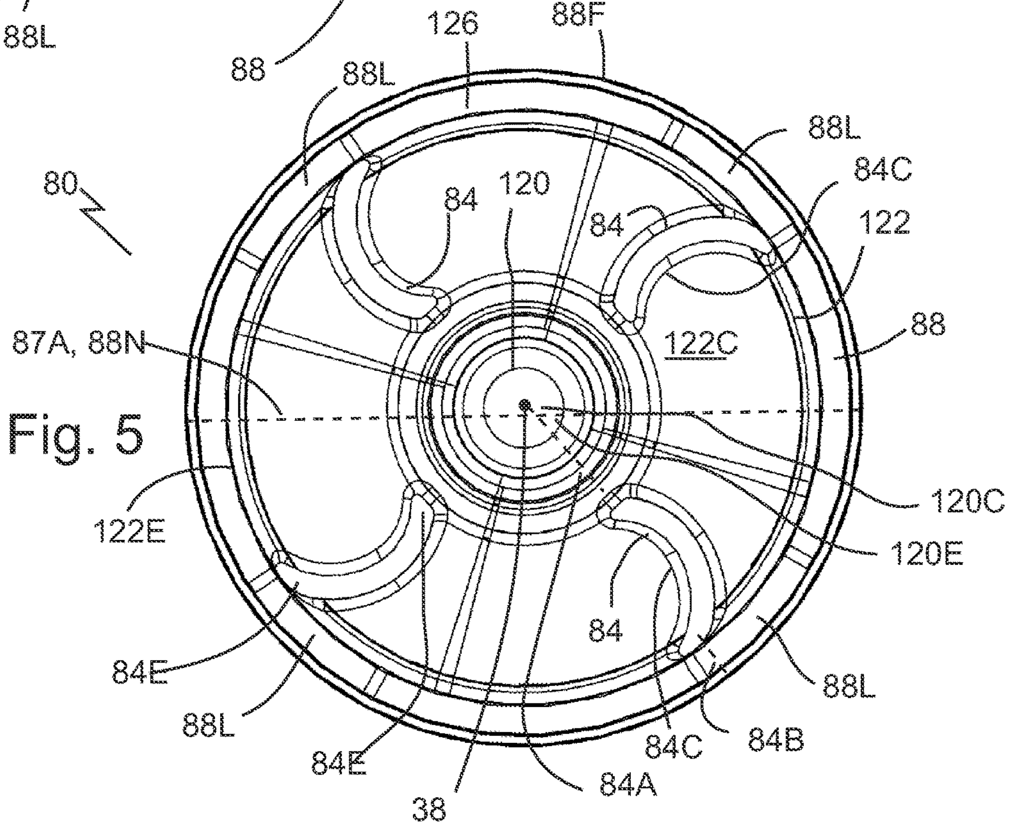
FIG. 5 is a front end view of the accelerator of FIG. 4.

Referring to FIGS. 3-5, an accelerator 80, such as an impellor, may be provided within the feed chamber 76 for rifling and/or increasing the angular velocity of the feed mixture prior to entering the sedimentation chamber 33. The accelerator 80 may extend from a leading axial end 80A to a base axial end 80B. An accelerator 80 may have plural fins or vanes 84, for example formed as a series of flat or curved plates as shown originating at or near or otherwise oriented to extend away from a common point coaxial with the rotational axis 38 of the centrifuge 10. Data suggests that while processing MFT with a traditional decanter centrifuge lacking an accelerator, the feed enters the chamber 33 at a relatively low angular velocity relative to that of materials in the chamber 33, and receives a significant excess amount of energy, resulting in turbulent flow. Such turbulence may be large enough to shear flocculating polymers, reducing polymer size and requiring relatively large amounts of flocculant to achieve the desired agglomerating effect. When an accelerator is used, the incoming feed mixture causes relatively less turbulence, and hence polymer shearing, despite the fact that the incoming feed may not have attained the same angular velocity as the conveyor 14 (in some cases 80% of the bowl 12 speed is achieved). In addition, the comparatively long path of flow in the thick liquid layer adjacent the nozzle 98 may permit excess energy to be dissipated in a manner as to prevent or reduce the occurrence of turbulent flows from liquids moving in a helical fashion around flight 60 to the centrate discharge.

Referring to FIGS. 1-3 and 6A, the accelerator 80 may have various characteristics and perform various functions. The conveyor body 50 may define the feed chamber 76, through which the feed mixture may pass through. The accelerator 80 may be contained within the feed chamber 76. The accelerator 80 may function to redirect feed mixture from axial to radial flow, and increase the angular velocity of a feed mixture prior to entering the sedimentation chamber 33. The accelerator may comprise an impeller with plural vanes 84. Referring to FIG. 3, the nozzle 98, or a port 90 that supplies the nozzle 98 and is defined in the outer surface 50E of the conveyor body 50, may be located radially outward of the impeller 80 in a plane, perpendicular to a centrifuge axis 38, defined by the impeller 80. The feed mixture may enter the feed chamber 76, change from an axial to a radial direction under acceleration by accelerator 80, and exit the feed chamber 76. Such a configuration may cause less turbulence and wear than a configuration where the feed enters the chamber moving in a first axial direction and is forced to change to a second axial direction opposite the first axial direction prior to discharge from the feed zone into the sedimentation chamber, or vice versa.

Referring to FIG. 3, the decanter centrifuge 10 may operate to process feed mixture in a suitable fashion. The feed mixture may initially be supplied into the feed conduit 30, for example via a feed inlet 22. The feed mixture, which may comprise a mix of solids and liquids, may continuously pass through the centrifuge 10 in use, for example by supplying (drawing, pumping, or by other means) the feed mixture from a tailings pond or other source. The feed mixture from a tailings pond may comprise mature fine tailings (MFT) produced from an oil sands process. The feed mixture, such as an MFT slurry, may be flocculated prior to supplying the feed mixture through the feed conduit, such as the feed inlet 22. Flocculation of the feed mixture, for example using polyacrylamides, may accelerate the settling in the centrifuge 10 and may affect phase separation. The supplication of feed mixture into the centrifuge 10 may affect the operation of the centrifuge 10 to separate the solids and liquids in a slurry or feed mixture.

Referring to FIG. 3, following the travel path of the feed mixture, the decanter centrifuge 10 may have a suitable method of operation to separate phases of a feed mixture. The decanter centrifuge 10 may operate to continuously process a feed mixture. The feed mixture may pass through the feed inlet 22 and may enter the feed chamber 76, which may be defined by a segment, such as portion or chamber 76, in the conveyor body 50 of the screw conveyor 14. The feed mixture may then be directed against the accelerator 80 within the feed chamber 76. The feed mixture may be sent into the sedimentation chamber 33 via radial ports 90 in the conveyor body 50. The accelerator 80 may have an impeller with plural vanes 84 through which the feed mixture may be propelled from the feed chamber 76 towards the radial ports 90 to be sent to the sedimentation chamber 33. The feed mixture in the sedimentation chamber 33 may start to have a partial phase separation of the solids and liquids of the feed mixture as the bowl 12 and conveyer body 50 rotates. The rotation of the bowl 12 and the conveyer body 50 may exert centrifugal force and may partially separate the feed mixture into solids and liquids. The different densities of the solid and liquid elements in the feed mixture may allow the separation of materials in a slurry. The centrifugal force may allow a mixture with heavier density to travel through the centrifuge 10 and be directed towards the outermost layer of the bowl 12, for example following the solid travel path in FIG. 3. The centrifugal force may also allow a mixture with lighter density to travel through the centrifuge 10 and be directed closest to the conveyor body 50, for example following the liquid travel path in FIG. 3. The separated elements may be directed to exit the centrifuge, where the solid elements may be discharged through the cake discharge port 24 and the liquid elements may be discharged through the centrate discharge port 26. The decanter centrifuge 10 may have a suitable method of operation for phase separation of a feed mixture.

Referring to FIGS. 3-5, the plural vanes 84 of accelerator may be structured for convenient replacement. Traditionally, replacement of the accelerator 80 warrants disassembly and rebuild of the conveyor body 50, which may be an expensive, time-consuming process, and may lead to significant downtime where the machine is not operating to achieve separation. In one example one or more parts of the accelerator 80, such as the plural vanes 84, are releasably mounted to the conveyor body 50. The plural vanes 84 of accelerator may be structured for convenient replacement.

Referring to FIGS. 3-5, the vanes 84 may be configured to be replaced out of one of the open axial ends of the conveyor body 50. The plural vanes 84, may be sized to pass through an axial end, such as first axial end 50C, of the conveyor body 50. Referring to FIG. 3, the decanter centrifuge 10 may facilitate a suitable method of repair for replacing the vanes 84 of the accelerator 80. The feed mixture that passes through the centrifuge 10 may go through the accelerator 80, which may cause the vanes 84 to wear over time. Worn vanes 84 may direct the feed mixture into the sedimentation chamber 33 with relatively less efficiency than unworn vanes, leading to inefficient or unsatisfactory separation of solid and liquid elements in the feed mixture. The accelerator vanes 84 may be replaced in a suitable fashion. Referring to FIGS. 4-6, 6A, and 8A1, in an example method, the vanes 84 may be releasable from the conveyor body 50, for example by loosening fasteners 144. Referring to FIGS. 3-5, the plural vanes 84 may be passed out of an axial end, such as end 50C or 44, of the conveyor body 50 to remove the vanes 84 from the centrifuge 10. Once removed, a second or new set of plural vanes 84 may be installed in the conveyor body 50, for example by passing the new set of plural vanes 84 through the axial end, such as end 50C or 44, of the conveyor body 50. The second set of plural vanes 84 to the conveyor body 50. Once repaired, or refurbished or retrofitted, the decanter centrifuge may be operated to once more continuously process the feed mixture.

Referring to FIGS. 4-6, 6A, and 8A1, the vanes 84 may be formed on a disc part 87. For example, the vanes 84 may be arrayed and spaced at different angular positions about an axis of rotation 38, for further example, radially spaced to originate a non-zero distance from the axis 38. The disc part 87 may comprise a ring part 122 and a nose part 120. The nose part 120 may define a leading point of the accelerator 80, which may be the first part of the accelerator 80 that comes in contact with and directs the feed mixture as the feed mixture enters the centrifuge 10 from the feed inlet 22. The ring part 122 of the nose part 120 may mount the plural vanes 84 The ring part 122 may define a leading face 122C and a base face 122B, which face and face away from, respectively, the incoming feed in use. The vanes 84 may be mounted on face 122C. The ring part 122 may have an axial opening 122A, for example defined by a cylindrical stem 122D. Opening 122A may be structured to receive and mount a corresponding stem 120A of nose part 120. In the example shown the nose part 120 is centered coaxial with axis 38, as is opening 122A to receive and align the nose part 120. The ring part 122 may form a perimeter rim 122E, on one or both of faces 122B and 122C, for example on base face 122B as shown. The ring part 122 may form a collar that encircles a base of the nose part 120, for example to mount the nose part 120 in the ring part 122. Each vane 84 may be formed, for example integrally, on the disc part 87, or may be mounted to the ring part 122, for example mounted releasably to allow a ring part 122 to be repaired by replacing one or more worn vanes 84.

Referring to FIGS. 4-6, 6A, and 8A1 the disc part 87 may be mounted on or form part of an accelerator base 88. The accelerator base 88 may have a disc shape or part as shown. A disc shape includes a part that spans or otherwise blocks the cross-sectional space defined within the cylindrical interior or bore of the conveyor body 50, and includes a plate structure, a ring with a plug in the bore thereof, or any functional equivalent of the foregoing. The plural vanes 84, for example the ring part 120, may be formed or mounted on a leading face of the accelerator base 88. For example, as shown in FIG. 4, the plural vanes 84 may be mounted on top of the disc part 87 of the disc base 88. The nose part 120 may be attached to the accelerator base 88. The accelerator base 88 may define a leading face 88E and a base face 88G, which may face and face away from, respectively, the incoming feed in use. The ring part 120 and/or disc part 87 may be mounted on face 88E. The base 88, for example face 88E of the base 88, may define an axial opening and/or an axial receiver, such as a stem receiver 135, for receiving, aligning, and mounting either or both the ring part 122 or nose part 120. In the example, a stem receiver 135B of receiver 135 is structured to receive the knob stem 120A of the nose part 120, for example to center the nose part 120 in the base 88. an axial stem receiver, for example defined by a cylindrical stem 122D. Receiver 135 may define a ring part receiver 135A, for example to receive and mount a corresponding stem 122D of ring part 122. In the example shown the stem receiver 135 is centered coaxial with axis 38 to receive and align the nose part 120 and/or ring part 122. The base 88 may form a perimeter rim 88F, on one or both of faces 88E and 88G, for example on base face 88G as shown. The base 88 may form a collar that defines a rear end chamber 88B. A tool connector, such as a tool stem 88C, may be defined in the rear face 88G, to permit the base 88 to be manipulated by a tool, for example to remove or install the base 88 from face 88G. The tool stem 88C may define an appropriate tool connector 88H, such as a hex bore as shown.

Referring to FIGS. 4-6, 6A, and 8A1 the base 88 may be structured to fit or receive one or both the disc part 87 and nose part 120. For example, the base 88, such as leading face 88E, may have a shape, such as a curved frustoconical shape that matches with a shape, such as an inverse curved frustoconical shape, of the base face 122B of ring part 122. The base 88 may form a seat for the disc part 87, for example the ring part 122. The leading face 88E of base 88 may define a perimeter rim 88A that defines a circular groove in which the perimeter rim 122E is structured to be fitted. One or more of base 88, disc part 87, and nose part 120 may be connected via a suitable mechanism, such as by adhering with adhesive. Other connection methods may be used, such as welding, molding, friction or interference fitting, and fasteners. In some cases, one or both of parts 87 and 120 are threaded directly into the base 88.

Figure 6:
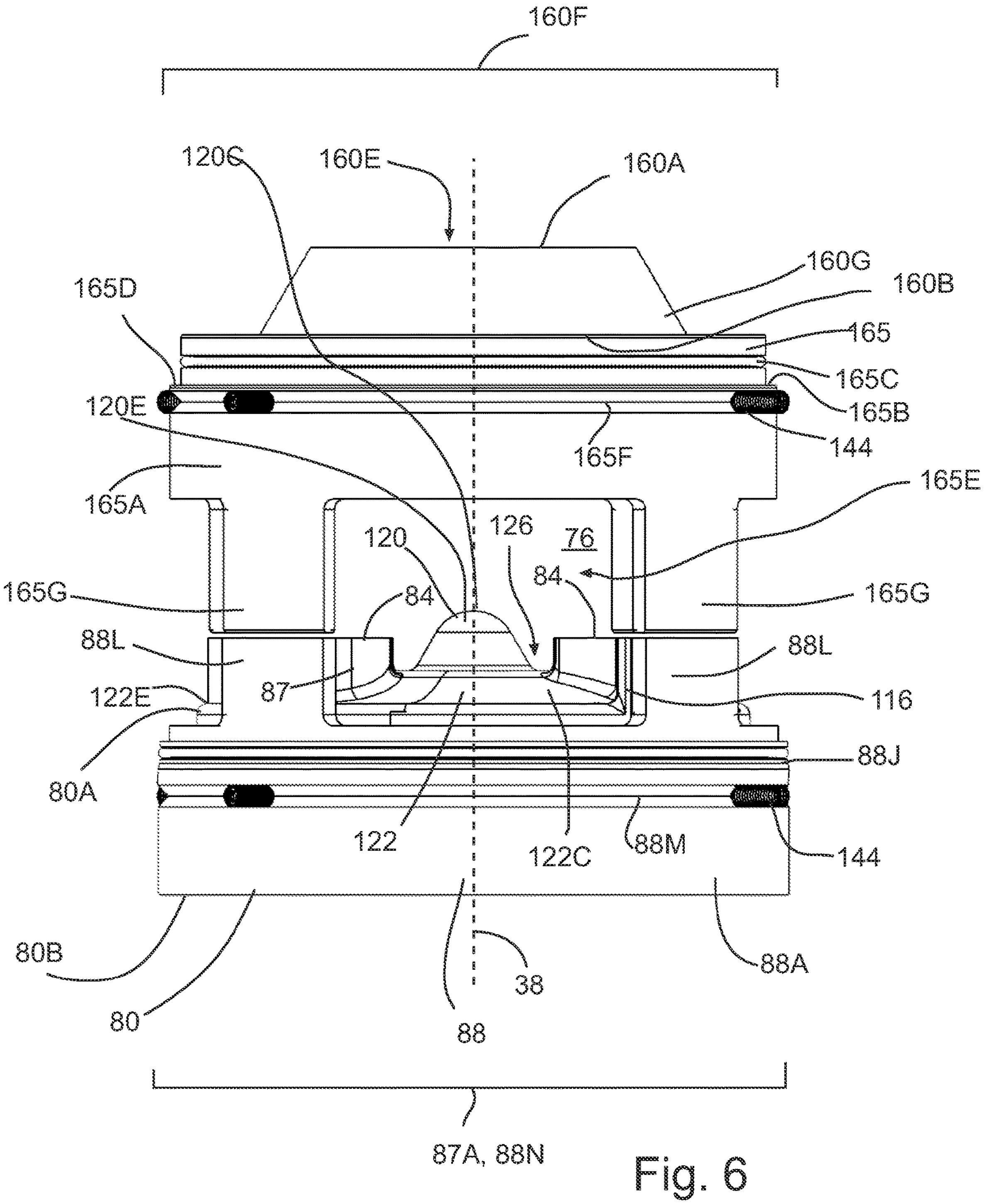
FIG. 6 is a side elevation view of a feed zone liner and accelerator combination from the conveyor of FIG. 1, with the position of fasteners shown.

Referring to FIGS. 3-6, 6A, and 11, the nose part may have suitable features. The nose part 120, for example knob 120E may be centered within the accelerator base 88 and/or ring part 122, with a tip 120C of knob 120E coaxial with the central axis 38, of the centrifuge 10, as shown in FIG. 3. The knob 120E may have a suitable shape for directing fluids radially outward toward the vanes 84. In the example the knob 120E has a convex shape, for example a conical or curved conical shape, coaxial with axis 38. Referring to FIGS. 6A and 11, the nose part 122 may protrude axially beyond the reach of the plural vanes 84 in a leading direction facing into the incoming fluid flow. The nose part 120 may provide for better flow efficiency of the feed mixture through the accelerator 80. The nose part 120 may be mounted to, for example centralized within, the accelerator base 88 via a stem 120A. The stem 120A of the nose part 120 may fit through the ring part 122 into a stem receiver 135 of the base 88, for further example nose part receiver 135B, which may be a bore structured to receive the stem 120A. The nose part 120 may be structured to seat upon the ring part 122, for example the nose part 120 may form a radial flange 120D that rests upon a seat groove 122F at a leading face of the perimeter rim 122E circumferentially surrounding the axial opening 122A. A cylindrical portion 120F of a base side of the nose part 120 may be structured to be received by the axial opening 122A of the ring part.

Referring to FIGS. 3, 6, and 6A, the accelerator 80 may mount within an outer collar body 150 of the conveyor body 50. The outer collar body 150 may have a generally cylindrical shape, for example extending from a leading axial end 150C to a base end 150D. The outer collar body 150 may mount one or both the accelerator 80 and a feed zone liner 160. The collar body 150 may form part of the conveyor body 50, for example an axial portion of the cylindrical part of the body 50. The ends 150C and 150D may tie in, for example by threading or welding (for example at weld gaps 151), to the other parts of the conveyor body 50. The collar body 150 may define an exterior surface 150A and an interior bore or surface 150B. The collar body 150 may mount the accelerator 80 within an accelerator mounting zone 150E of the surface 150B. The collar body 150 may mount the feed zone liner 160 within a feed zone liner mounting zone 150G of the surface 150B. The collar body 150, for example interior surface 150B, may form a seat such as accelerator mounting seat shoulder 150F, to receive and seat the accelerator 80, for example to engage a radial flange 88D of accelerator 80. Thus, the conveyor body 50 may be shaped to define or comprise a radial stop that forms an axial seat (shoulder 150F) for the accelerator 80. The collar body 150, for example interior surface 150B, may form a seat such as a feed zone liner mounting seat shoulder 150H, to receive and seat the feed zone liner 160. Thus, the conveyor body 50 may be shaped to define or comprise a radial stop that forms an axial seat (shoulder 150H) for the feed zone liner 160. The outer collar body 150 may define the radial feed ports 90 to the exterior surface 50E of the conveyor body 50. In other cases, the body 150 may be formed of plural parts secured together, although the example shown is a single machined part. One or more gaskets may be used to seal axially between the accelerator 80 and the conveyor body 50, for example a groove 88J may be provided in base 88 to receive an O-ring that engages interior surface 150B of outer collar body 150 when the accelerator 80 is seated therein. One or more gaskets may be used to seal axially between the feed zone liner 160 and the conveyor body 50, for example a groove 165C may be provided in base 165 to receive an O-ring that engages interior surface 150B of outer collar body 150 when the feed zone liner 160 is seated therein.

Referring to FIGS. 3, 6, and 8A1-8B2, the decanter centrifuge 10 may have a releasable fastening mechanism to allow installation, removal and replacement of the accelerator 80 or parts thereof without full disassembly of the centrifuge 10. The plural vanes 84, for example the entire accelerator 80 or part thereof, may be releasably mounted by fasteners 144 that are accessible from an exterior, such as surface 50E, of the conveyor body 50. The conveyor body 50, for example outer collar body 150, may be structured to receive fasteners 144 that secure the accelerator 80. The fasteners 144 may extend through the radial bores 150J that extend from an outer surface of the outer collar body 150, to engage an outer surface 80C of the accelerator 80, for example of the accelerator base 88. The fasteners 144 may engage a groove or grooves, such as a circumferential groove 88M of the base 88. In other cases, the fasteners 144 may engage corresponding bores (not shown) in the base 88 or disc part 87. The fasteners 144 may comprise set screws, whose heads may be inset flush with or below the outer surface 50E of the conveyor body 50, and may or may not be capped. The fasteners 144 may reach and penetrate through the conveyor body 50 and into the accelerator 80. Once the fasteners 144 are secured in groove 88M, the accelerator 80 is held securely against axial movement within the conveyor body 50. Once the fasteners 144 are withdrawn from engagement with the accelerator 80, the accelerator 80 or part thereof may be axially withdrawn from within the conveyor body 50.

Referring to FIGS. 3 and 6, the accelerator 80 or part thereof may be structured to be removable through an open axial end of the conveyor body 50. For example, the plural vanes 84 may be formed on a disc part 87 that has a maximum outer diameter, for example diameter 87A, that is smaller than a minimum inner diameter, for example diameter 50D of the axial end 50C of the conveyor body 50. In the example shown, the entire accelerator 80 is structured to be axially withdrawn from the interior of the conveyor body 50, for example by having a maximum outer diameter 88N of the base 88 equivalent to the diameter 87A. Once the fasteners 144 are disengaged with accelerator 80, the accelerator 80 may be removed. In operation, the axial end 50C will typically be sealed, for example via an axial end plate 36A, and thus prior to removal or installation of accelerator 80, any such plate 36A or covering may need to be removed or opened from end 50C. However, by structuring and securing the accelerator 80 as shown, the accelerator 80 is able to be installed, removed, or replaced without dismantling the conveyor body 50. In other cases, only part of the accelerator 80 may be removable in such a fashion, for example if the ring part 122 were removable by removing fasteners 144 whereas the base 88 were not.

Referring to FIGS. 3, 6, and 6A the centrifuge 10 may comprise a feed zone liner 160, for example for directing fluids efficiently to the accelerator 80. The feed zone liner 160 may be located upstream of the accelerator 80, for example within the feed chamber 76. The feed zone liner 160 may be structured to encourage or produce laminar axial flow of the feed mixture prior to contact with the accelerator 80. The feed zone liner 160 may define a leading end 160A and a base end 160B, with fluids traveling in use from end 160A to end 160B. The liner 160 may define an axial feed port 160E, for example coaxial with axis 38. The feed port 160E may be defined by a nose, such as a conical or convex nose 160G. Referring to FIGS. 3, 6, 6A, 7A, and 8B1/8B2, one or more guide baffles or fins 160D may be arrayed at angular positions about an interior surface 160C of the liner 160. The guide fins 160D may be arranged evenly around the axial feed port 160E. Fins 160D may narrow in the direction of flow. The feed zone liner 160 may direct the fluid towards the accelerator 80, which may encourage laminar flow to ensure optimal operation of the accelerator 80. The feed zone liner 160 may also function to direct excess fluid to overflow ports 77A, in case the feed chamber may have an abundance of incoming feed mixture. In the event the accelerator 80 becomes overloaded, the excess feed mixture may exit through overflow ports 77A.

Referring to FIGS. 3, 6, and 6A, the nose may be part of a ring part that defines the axial feed port 160E. The feed zone liner 160 may comprise a base 165. The base 165 may define an exterior surface 165A of the liner 160. A leading radial flange 165B or other suitable stop may be structured on surface 165A to engage or seat upon a corresponding seat shoulder 150H of outer collar body 150. A collar part 165D may be located at leading end 160A of the liner 160, for example to mount groove 165C.

Referring to FIGS. 1, 3, 6, and 8B1-8B2, the decanter centrifuge 10 may have a releasable fastening mechanism to allow installation, removal and replacement of the feed zone liner 160 or parts thereof without full disassembly of the centrifuge 10. The feed zone liner 160 or parts thereof may be releasably mounted by fasteners 144 that are accessible from an exterior, such as surface 50E, of the conveyor body 50. The conveyor body 50, for example outer collar body 150, may be structured to receive fasteners 144 that secure the feed zone line 160. The fasteners 144 may extend through the radial bores 150K that extend from an outer surface of the outer collar body 150, to engage an outer surface 165A of the feed zone liner 160, for example of the feed zone liner base 165. The fasteners 144 may engage a groove or grooves, such as a circumferential groove 165F of the base 165. In other cases, the fasteners 144 may engage corresponding bores (not shown) in the base 165 or liner 160. The fasteners 144 may comprise set screws, whose heads may be inset flush with or below the outer surface 50E of the conveyor body 50, and may or may not be capped. The fasteners 144 may reach and penetrate through the conveyor body 50 and into the feed zone liner 160. Once the fasteners 144 are secured in groove 165F, the liner 160 is held securely against axial movement within the conveyor body 50. Once the fasteners 144 are withdrawn from engagement with the liner 160, the liner 160 or part thereof may be axially withdrawn from within the conveyor body 50.

Referring to FIGS. 3 and 6, the feed zone liner 160 or part thereof may be structured to be removable through an open axial end of the conveyor body 50. For example, the ring part or nose 160G, or the liner 160 (for example base 165) as a whole may have a maximum outer diameter, for example diameter 160F, that is smaller than a minimum inner diameter, for example diameter 50D of the axial end 50C of the conveyor body 50. In the example shown, the entire liner 160 is structured to be axially withdrawn from the interior of the conveyor body 50. Once the fasteners 144 are disengaged with liner 160, the liner 160 may be removed. Prior to removal or installation of liner 160, any such plate 36A or covering may need to be removed or opened from end 50C. In addition, the accelerator 80 may need to be removed. However, by structuring and securing the liner 160 as shown, the liner 160 is able to be installed, removed, or replaced without dismantling the conveyor body 50. In other cases, only part of the liner 160 may be removable in such a fashion, for example if the nose were removable by removing fasteners 144 whereas the base 165 were not.

Referring to FIGS. 3-6, 6A, and 11, the accelerator may act to efficiently redirect incoming feed mixture radially outward. The incoming feed mixture from the inlet 22 may be separated radially outward, in which the knob 120E splits the flow, and the rotating vanes 84 of the accelerator 80 act to induce a vortex or other suitable rotating action on the feed mixture to bring the mixture up to a relatively higher angular velocity prior to sedimentation. By shaping the nose knob 120E as a truncated cone whose pointed end or tip 120C faces the feed conduit 30, air occurring in the feed or having become entrained by the feed while flowing into the inlet 22 may be passed away along the periphery of the knob, thereby preventing an air cushion from occurring in the inlet 22 which may interfere with the intended flow. The baffle knob may protrude in a direction towards the inlet 22 pipe. Such a structure may provide for improved control of the inflowing feed when it changes from being an axial flow to being a radial flow by softening or reducing feed zone material acceleration.

Referring to FIGS. 3-6, 6A, and 11 the vanes 84 may be structured to direct feed mixture radially outward, for example toward radial feed ports 90 to the exterior of the conveyor body 50. The vanes 84 may have substantially radial, elongate ribs, uniformly distributed at various angular positions around a periphery of the knob 120E, for example in a crosshair configuration. Each vane 84 may be positioned with a respective end 84E originating at or radially outward from a periphery of the knob 120E. Each vane 84 may be curved. In the example shown, each vane 84 is structured such that a leading face 84C is curved, for further example in a forward curve shape. In a forward curve pattern, the leading face 84C of the vane 84 has a convex shape that directs fluid more tangentially outward than purely radially outward movement. A forward curve thus ejects feed mixture radially into nozzles 98 while still following a spiral or circumferential path in cooperation with the rotation of the conveyor body 50 itself. A larger momentum may thus be transferred to the liquid in the feed chamber 76 in case the free liquid surface approaches the periphery of the knob 120E, because the rate of flow of the feed increases. By altering the shape of the vanes 84, from rectilinear ribs to ribs that are curved around the projection following a helix, the flow may be directed more strongly towards the ports 90, thereby obtaining an improved axial distribution of the feed. By altering the radial extension of the ribs, it may be possible to ensure that the free surface of the liquid may not approach such a small radius that the liquid back flows out of the feed chamber 76 into the overflow ports 77A through the annulus defined between the outer wall of the feed conduit 30 and the axial bore of the plate 77.

Referring to FIGS. 3-6, 6A, 9A1-9A2 and 9B1-9B2, radial ports may be defined by the conveyor body 50, and in some cases the accelerator 80 and/or feed zone line 160 as well. The conveyor body 50 may define one or more radial ports 90 in the outer surface 50E of the body 50. The feed redirection nozzles 98 may be in communication with the feed chamber 76 via the respective radial ports 90. The accelerator 80, for example the base 88, may form posts 88L, that define gaps 126 that each align with and define part of a respective radial port 90. The feed zone liner 160, for example the base 165, may form posts 165G, that define gaps 165E that each align with and define part of a respective radial port 90. In the example shown, both posts 88L and 165G thus cooperate to form part of ports 90.

Referring to FIGS. 3, 6A, 9A-9A2, and 9B1-9B2, one or more wear liners 116 may be present in the radial ports 90. The wear liners 116 may form an axial seat for one or both the accelerator 80 and feed zone liner 160. Referring to FIG. 6A, a perimeter rim 88A or other part thereof may contact the liner 116 (for example exterior surface 116A of liner 116) to form an axial seat that prevents the accelerator 80 from axially advancing within the conveyor body 50. A perimeter rim 165H other part thereof may contact the liner 116 to form an axial seat that prevents the liner 160 from axially withdrawing within the conveyor body 50. The wear liner 116 may be replaceable. The wear liner 116 may be internally aligned to protect radial port 90 from abrasion from the accelerated feed mixture. Referring to FIG. 3, the feed conduit 30 may be connected to supply a feed mixture of solids and liquids to the feed chamber 76 formed within the conveyor body 50. The feed mixture in the feed chamber 76 may pass through a radial port 90. The radial port 90 may be the initial contact of the feed mixture from the accelerator 80, which may have an accelerated force that may compromise the port 90. Each wear liner 116 may conform to the shape of the interior wall surface of the radial port 90.

Referring to FIGS. 3-6, the vanes 84 may, in isolation, be structured to increase the velocity of the feed mixture only part of the way up to the angular velocity of feed mixture in sedimentation chamber 33 (FIG. 3). The ribs or vanes 84 may extend a radial distance 84A from the axis of the accelerator 80 (as shown the impellor axis is coaxial with the bowl axis 38 so only the axis 38 is illustrated). The radial distance 84A may be selected to be a portion, for example less than half, of the radial distance 84B from the axis 38 to the conveyor body 50 surface 50E. The vanes 84 may be radial ribs uniformly distributed along the periphery of the baffle knob 120E. The ribs may extend along straight lines or helical lines or other suitable shapes. The vanes 84 may impart a sufficient rotation to the feed in the inlet with the view of obtaining a stable circulation flow in the inlet cavity.

Referring to FIG. 1, a method of operating and repairing a decanter centrifuge 10 may be carried out. The decanter centrifuge 10 may be operated to continuously process a feed mixture therein. The feed mixture may be supplied through a feed conduit 30 into feed chamber 76. The feed mixture may be directed by an accelerator 80 within the feed chamber into the sedimentation chamber via radial ports 90 in the conveyor body 50. The bowl 12 and the conveyor body 50 may be rotated to effect at least a partial phase separation of the solids and liquids of the feed mixture. Solids may be discharged through the cake discharge (port 24). Liquids may be discharged through the centrate discharge (port 26). The operation of the centrifuge 10 may be halted, for example when the vanes 84 become worn. The plural vanes 84 may be released from the conveyor body 50. For example, fasteners 144 may be removed from groove 88M to disengage the accelerator 80. The vanes 84 may be passed out of an axial end 50C of the conveyor body 50. A second set of plural vanes 84 may be installed in the conveyor body 50 by passing the second set through the axial end 50C. The second set may be mounted to the conveyor body 50 for example by inserting fasteners 144 through bores 150J in the outer collar body 150 into groove 88M. The decanter centrifuge 10 may again be operated to continuously process the feed mixture. The feed zone liner 160 may be replaced or removed via a similar method.

Referring to FIGS. 1-3, the screw conveyor 14 may be structured to permit axial flow of fluids in the sedimentation chamber 33. In one case axial flow is permitted radially inward of (as shown), or axially through, flight 60. An axial flow passage 65 may be defined between the conveyor body 50 and a radially inward facing edge 68B of flight 60, for example pond flight 60B. The axial flow passage 65 may define axial flow passage or passages 65 that extend across the pond section 37, for example from a feed inlet such as feed redirection nozzles 98, to the second axial end 36 of bowl 12.

Referring to FIG. 3, permitting axial flow may improve laminar flow of liquids in the chamber 33 and reduce turbulence and fluid velocity. With a solid flighting system, the liquid portion of the slurry must wind its way around the helix of flight 60 to reach centrate discharge port 26. By contrast, data suggests that when MFT is processed using a solid helical flight 60 (not shown) in the pond section 37, the liquid is forced to travel around the helical flow channel defined by the flight 60, toward end 46. Liquids passing around the helix create turbulence that tends to upset settling of the solids in the MFT, carrying such solids all the way up to the second axial end 36 of the pond in some cases. Turbulence may also reduce polymer (floc) size, decreasing settling efficiency and increasing the amount, and hence cost, of flocculant added. Thus, by permitting quasi or fully axial flow of liquids toward the centrate discharge port 26, such turbulence is reduced, leading to solid drop out and settling along the pond section 37, after which conveyor 14 then carries such solids towards the beach section 35.

Referring to FIG. 3, in the example shown, axial flow of fluids may be achieved by mounting the helical flight 60 to an outer surface 50E of the conveyor body 50 via a plurality of radial gussets, plates, or posts 62. Thus, the helical flight 60 is radially spaced from the conveyor body 50 to define the axial flow passage or passages 65. A stiffener part, such as a helical bar 72, may be mounted to flight 60 to increase the rigidity of flight 60. In some cases, the flight 60 may be mounted on an outer edge of a series of vanes 61 that extend parallel to axis 38 and are radially spaced about the conveyor body 50. In further cases, windows (not shown) may be cut through the flight 60 to provide axial flow. The gaps 66 between posts 62, conveyor body 50 and inner edge 68B, or the use of windows in flight 60, may permit quasi or fully axial laminar flow, for example from the feed inlet to the centrate discharge port 26.

Referring to FIG. 3, centrifuge 10 may be used in a continuous process to affect a phase separation of a feed mixture. As above, feed mixture, such as including MFTs produced from an oil sands process, may be supplied through a feed conduit 30 into a feed chamber 76. Nozzles 98 may be used to direct the feed mixture into the sedimentation chamber 33, in which the nozzle directs the feed mixture toward an axial flow passage 65 defined between the conveyor body 50 and an inner edge 68B of a conveyor flight 60. The bowl 12 and conveyor body 50 may be rotated to affect at least a partial phase separation of the solids and liquids of the feed mixture. Solids may be discharged through the cake discharge port 24, and liquids discharged through the centrate discharge port 26.

Referring to FIG. 3, the axial flow feature described here is provided on the pond section 37 only in some cases. As shown, the flight 60, for example the part 60A of flight 60 that extends across the beach section 35, may form a windowless helix (solid) that hugs the conveyor body 50, for example by having inner edge 68A of flight 60A fused to the conveyor body 50 continuously along a length, for example the entire length as shown, throughout the beach section 35. In such cases, axial surface flow of liquids is permitted only in pond section 37, but not in beach section 35. A baffle, such as a baffle ring or disc, may encircle the conveyor body 50 in the beach section 35 to act as a weir that blocks axial and helical travel of liquids toward first axial end 34.

Referring to FIGS. 3, 8B1, and 8B2, each nozzle 98 may be mounted over, in some cases integrally projected in a radial direction out of, an outer surface 50E of the conveyor body 50. Referring to FIG. 8B2, the nozzle 98 may define a hood 102, for example that is positioned over the outer surface 50E and forms an elbow-shaped flow passage 101 that extends from a radial base opening 90A to an axially facing nozzle opening. Referring to FIG. 3, the radial base opening 90A may be aligned with the radial port 90 in the conveyor body 50 in use. Thus, feed mixture passes into the nozzle 98, changes direction, for example from radial to an axial direction, and exits the nozzle 98, heading toward the second axial end 36 of the bowl 12.

Referring to FIG. 3, with MFT applications, feed mixture supplied via radially directed ports 90 directly into the sedimentation chamber 33 (no nozzles 98), appears to create turbulence, upsetting settled solids passing from the pond to the beach, and in some cases leading to wear in the internal encircling wall 32 of the bowl 12. By contrast, nozzles 98 redirect the feed mixture away from the bowl 12 wall 32 to initiate axial flow in feed supplied to the chamber 33, and thus may reduce disruption to settled solids passing to the beach. The nozzles 98 shown supply feed mixture directly into the pond. Where axial flow passages 65 are defined by the flight 60 and used in combination with nozzles 98, laminar flow may be further improved, and wear on the bowl 12 may be reduced as the jet of feed mixture supplied to the sedimentation chamber 33 passes into the pond, where the energy of the redirected jet is dissipated. Where the nozzles 98 are mounted to the conveyor body 50 and the passages 65 are axially aligned with the openings 100 in the nozzles 98, the conveyor body 50, nozzles 98, and passages 65 rotate together and thus always remain in alignment, avoiding or reducing wear on adjacent posts 62 or sides of flight 60 if windows are used in flight 60.

Referring to FIG. 3, an outer radius 107 of the redirection hood 102 may be smaller than an inner radius 64 of the flight 60B. Therefore, the redirected fluids travel along axial paths that are radially inward of the flight 60B towards the liquid end hub. In one case, a minimum or average radius 64 of the radially inward facing edge 68B of the flight 60 may be greater than or commensurate with a maximum radius 107 of the discharge opening 100 in the hood 102. Both embodiments may reduce or eliminate the effect of the incoming feed mixture jet causing wear on the flight 60, by providing a reduced radial footprint for the nozzle 98. In one design configuration the radius 107 is the maximum radial height of the hood 102 itself. In some cases, the distance of the radius 107 is less than or equal to half the radial distance or height 109 of the pond itself. The shorter the radial extension of the hood 102 into the sedimentation chamber 33, the less negative effect, if any, of the hood 102 on settled solids being conveyed from the pond to the beach.

Referring to FIGS. 1-3, the nozzle 98 may have suitable parts. The hood structure of the nozzle 98 may be defined by spaced side walls, a rear wall, a top wall, which may or may not curved, slanted, or curved and slanted, in order to achieve a directional change in the internal flow passage 101. The nozzle 98 may be mounted to the conveyor body by a suitable mechanism, for example fasteners such as bolts (not shown) passed through bolt holes into the conveyor body. A replaceable wear liner 114 may be positioned within the nozzle 98. The liner 114 may or may not conform to the shape of some or all of the inner surfaces of the nozzle 98 that define the flow passage 101. In the example shown the wear liner is a tungsten carbide insert that is divided into two identical halves, though other configurations and number of parts may be used. Wear liners 116 in this document may have similar characteristics as liners 114. The wear liner 114 may also have a pair of spaced side walls, a rear wall, and a top wall. The wear liner 114 may be formed of a wear resistant material that acts as a sacrificial part that protects the nozzle 98 from fluid breakout, and that may be replaced periodically at a lesser expense than replacement of the entire nozzle 98.

Referring to FIGS. 3, the feed chamber 76 may be defined by a radially confining wall (conveyor body encircling surface 50E), a first axial end wall, such as a plate 79, and a second axial end wall, such as a plate 77. The feed chamber 76 may receive feed mixture through a port 79A in plate 79, for example connected to feed conduit 30. The accelerator 80 may be mounted, for example fixed, to the plate 77. If fixed, accelerator 80 will rotate with conveyor body 50, thus inducing vortex action within feed chamber 76 during use.

Referring to FIG. 3, the centrifuge may comprise overflow ports 77A, through which excess or increased flow of feed mixture may pass and circulate through the conveyor body 50. The conveyor body 50 may define the overflow ports 77A to an outer surface 50E of the conveyor body 50 to increase the rate of flow of solid discharge. The overflow ports 77A may be located in the upper chamber of the conveyor body 50, such as upstream of the feed zone liner 160. The flow of the feed mixture may become overwhelming for the accelerator 80 and the radial ports 90. The overflow ports 77A may assist the abundance of incoming feed mixture by allowing the excess feed mixture to leak out of the conveyor body 50 and flow into the beach section 50B of the conveyor body 50. The feed mixture that overflowed to the beach section 50B may later flow back into the conveyor body 50 through the same ports 77A, in which the feed mixture may finally pass through the accelerator 80 and the radial ports 90. The overflow ports 77A may be circular in cross section to allow passage of the overflowed feed mixture through the ports 77A.

Referring to FIGS. 1-3, various parts may be provided to operate the centrifuge 10. For example, a drive, such as a motor and gearbox may be mounted to rotate the bowl 12 and conveyor 14. The gearbox may connect to simultaneously rotate the journaled screw conveyor 14 and the bowl 12 at different angular velocities relative to one another, for example through respective drive shafts (not shown). By rotating the bowl 12 at a different speed, for example 1-100 rpm faster than the conveyor 14, the conveyor 14 applies a relatively gentle conveying effect to move settled solids towards the cake discharge port 24. In some cases, the drive comprises plural drive motors and gearboxes that each drive and support a respective one of the conveyor 14 or bowl 12, for example if each drive were mounted on a respective axial end 34, 36. One or both the first and second axial ends 34 and 36 may each be mounted to a respective bearing unit, such as an oil bath or grease bearing unit, and the bowl 12 and conveyor 14 may rotate around a common axis 38. The centrifuge 10 may be mounted on a suitable structural frame, with or without a removable hood or casing 28.

Feed mixture may be supplied to chamber 33 via feed conduit 30 by a suitable pumping mechanism, and in a continuous fashion. For example, feed conduit 30 may enter the centrifuge by passing through a bearing unit in one of the axial ends 34, 36, and connecting to the internal feed box or chamber 76. In some cases, the feed mixture may comprise mature fine tailings produced from an oil sands process, for example if the feed conduit 30 is connected to receive such a feed mixture. In the example shown, a pump draws MFT from a tailings pond, at a level sufficiently below the pond surface to access MFT. In other cases, other types of fluids from the tailings pond may be accessed. The MFT is pumped via line to feed conduit 30. Other pre-centrifuge processing steps may be carried out, for example to heat or dilute the MFT by addition of water.

The feed mixture supplied to the feed chamber 76 may also comprise a suitable flocculant. In flocculation, a chemical is added to agglomerate particles, which may be destabilized by addition of a coagulant, into relatively large particles colloquially called flocs, whose relatively large molecular weight causes an increase in density and drop out from the liquid phase. Flocculants include relatively high molecular weight, water soluble organic polymers. A flocculant may be added from a suitable source, such as a tank, using machinery such as an addition pump and a mixer in some cases (not shown).

Phase separated materials, such as liquids and solids discharged from centrifuge 10, may be subject to further processing or disposal as desired. For example, solids from cake discharge port 24 may be ejected onto a conveying device, which may transport same to a disposal area. Liquids removed from centrate discharge port 26 may be transported via a line to a suitable disposal site, such as the tailings pond where the feed mixture was taken from. Oil and water separation may be carried out on centrate to remove entrained bitumen. Connections and communication between parts may occur through intermediate components. Radial ports 90 may have a suitable position and shape, for example such may be spaced radially and axially from one another, in a helical fashion. Ports 90 may be circular, oval, or other suitable shapes.

There may be a close fit between an outer edge 71 of flight 60 and the bowl 12, such as 1-2 mm or other distances. More than one flight 60 may be provided, for example a double helix. Flights 60A and 60B may be separate or connected flights. Bowl 12 speeds of 800-4000 rpm may be used or other suitable speeds. Conveyor flights 60 may have a suitable rake, such as a positive, negative, or neutral (as shown in FIG. 3) rake.

A centerless conveyor may be used, for example without a central conveyor body 50. Centrifuge 10 may be used in applications other than processing MFT from oil sands, such as processing tailings from a mining process. MFTs may comprise solids of 10-45% by weight of the feed mixture, although other ranges may be used. A vertical or horizontal centrifuge may be used. A co-current or counter-current flow may be used. A solid bowl 12 may be used with a conical, cylindrical, and cylindrical-conical configuration.

The centrifuge 10 may be used to affect a liquid-gas-solid, liquid-liquid, gas-liquid separation, or other suitable arrangements. Nozzles 98 may impart a direction change of ninety degrees to the feed mixture. In some cases, the nozzles 98 may direct the feed mixture in an axial direction, which may be a vector with a dominant axial scalar component, and forming an angle with respect to axis 38 of less than forty-five degrees, for example less than ten degrees and in some cases zero degrees. The conveyor body 50 may be solid or hollow as shown.

The mouth of the inlet apertures (for example nozzles) may be located on a radius greater than the radius to the outlet openings, such that a peripheral area of the inlet outwardly defined by the radius to the inlet apertures is free of carriers, inwardly extending projections. Parts of the centrifuge 10 may be arranged to inherently balance the device, for example by uniformly distributing nozzles, feed passages, and other parts radially about the circumference of conveyor body 50. Weight balance may be achieved by arranging components to have a center of gravity along axis 38 during use. The impellor, such as accelerator 80, and the vanes 84 may be fastened to the accelerator base 88, for example in a removable fashion to permit removal in case such was not needed with the particular feed mixture processed, or in order to replace a worn part.

Plates 34A and 36A (FIG. 3) may each have an axial opening 44, 46, respectively, for various purposes such as receiving the feed conduit 30 and/or mounting drive shafts or bearings. Beach section 50B of conveyor body 50 may be shaped in a conical fashion to follow the shape of the beach section 35 of bowl 12. In one embodiment the inlet pipe or feed conduit 30 may be repositioned, for example along the axis 38 to adjust the distance between the outlet of the feed conduit 30 and the knob 120E or accelerator. Thus, the diameter of the feed jet at the baffle knob 120E may be altered by displacement of the feed conduit, thereby making it possible to adapt the flow in the feed chamber 76 to the type of feed and/or the rate of flow thereof. The impeller, such as accelerator 80, may be geared to rotate faster or slower than the rotation of conveyor body 50. Flocculant may be added to the feed mixture before, during, or after (by injection into the sedimentation chamber) the feed mixture is supplied to the sedimentation chamber section. Radially spaced may refer to the fact that parts are spaced about a circumference of an object, whether the circumference is taken by a cross-section or is projected into a plane.

In a decanter centrifuge, there may be a violent shearing effect imparted on the incoming feed mixture as the mixture changes direction and begins to rotate with the internal contents of the centrifuge. Polymer flocculants include water-soluble polymers that can form flocs from individual small particles in a suspension by adsorbing on particles and causing destabilization through bridging or charge neutralization. Polymer flocculants may promote the separation of particles from water to clean water. In colloid chemistry, flocculation refers to the process by which fine particulates are caused to clump together into a floc. The floc may then float to the top of the liquid (creaming), settle to the bottom of the liquid (sedimentation), or be readily filtered from the liquid. In some cases, a sufficiently high enough amount of shear energy may damage or break the long carbon chains of the virgin polymer, which may reduce the effectiveness of the flocculant, for example by shortening the polymeric chains, and reducing the molecular weight of the flocculant. A reduction in molecular weight due to shearing action may be disadvantageous in that the flocculant may operate less effectively to remove solids, requiring the mixture to spend a relatively longer retention time in the pond section 37 of the centrifuge 10 in order to facilitate the same settling distance than would have been otherwise accomplished by a longer, higher molecular weight unsheared flocculant. Such an effect may be counterproductive to settling.

Figure 12:
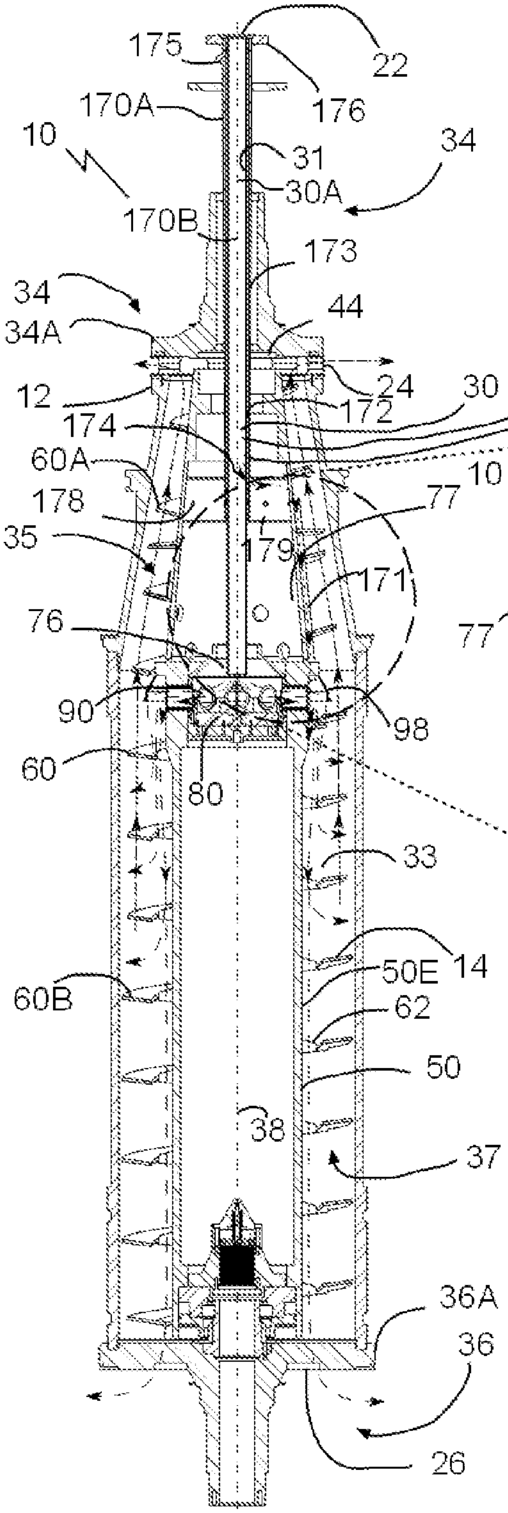
FIG. 12 is a cross-sectional view of a conveyor and bowl for a decanter centrifuge, illustrating the operation of a flocculant conduit to the sedimentation chamber.
Figure 12A:
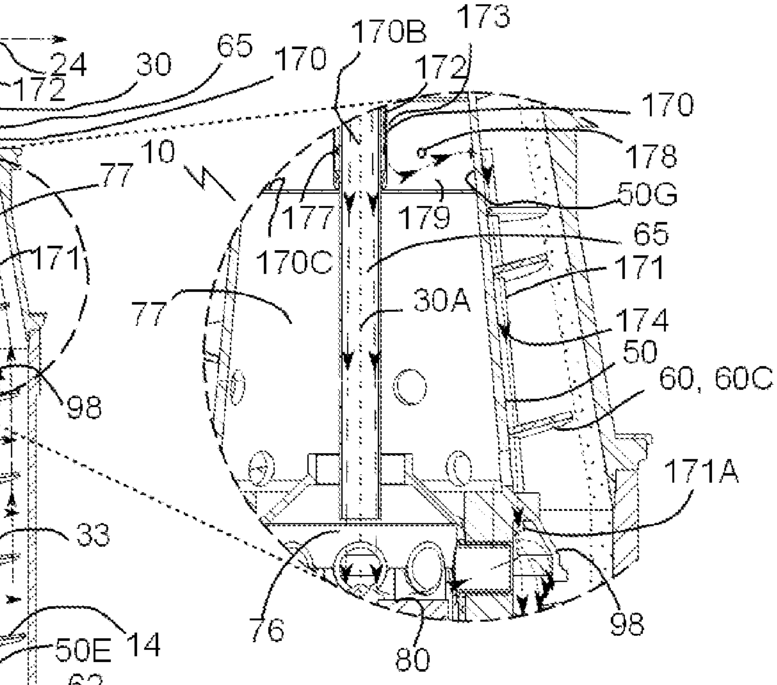
FIG. 12A is a close up view of the circular area denoted by dashed lines in FIG. 12.

Referring to FIGS. 12 and 12A, the decanter centrifuge 10 may be structured to reduce or avoid shear effects on incoming flocculant. The centrifuge 10 may comprise a flocculant conduit 170 structured to supply a suitable flocculant, such as a polymer flocculant, to the sedimentation chamber 33. A flocculant that is mixed with the feed mixture prior to, while, or shortly thereafter entering the centrifuge 10, may begin to flocculate in the feed conduit 30 prior to being accelerated up to centrifugal separation rotation speed, and thus once accelerated, the relatively high shear forces induced by the rotating centrifuge may damage the flocculant, reducing the size of the polymeric matrix. By contrast, by supplying the flocculant, for example in a virgin state, into the sedimentation chamber 33, and thus at least partially bypassing the feed conduit 30, the negative effects of shear on the polymer may be relatively reduced, because the flocculant is accelerated prior to undergoing substantial flocculation with the feed mixture.

Referring to FIGS. 12 and 12A, the feed and flocculant may be supplied through one of the axial ends 34 of the conveyor body 50. A feed inlet 22 may be defined at the axial end 34 for connecting with a feed line from a feed mixture source (such as a tank or tailings pond). The flocculant may enter the centrifuge 10, for example the upstream portion 170A, through an inlet 175 defined at the axial end 34, for example the flocculant may be added to the annulus section of the polymizer feed tube assembly exterior to the centrifuge 10 at the inboard side of a feed tube mounting flange 176. The feed conduit 30 and an upstream portion 170A of the flocculant conduit 170 may extend from axial end 34 of the conveyor body 50 and through an interior of the conveyor body 50. The mounting flange 176 or other suitable connector may be present at the axial end 34 for connecting one or both the feed conduit 30 and flocculant conduit to respective feed and flocculant sources. The feed conduit 30 and the upstream portion 170A of the flocculant conduit 170 may be oriented parallel with a central axis 38 of the conveyor body 50. An axis 30A of the feed conduit 30 and an axis 170B of the upstream portion 170A of the flocculant conduit 170 may be coaxial with one another, for example if the conduits 30 and 170 are nested together as shown. One or both of the feed conduit 30 and the flocculant conduit 170 may be formed by respective tubes 31 and 173. The upstream portion 170A of the flocculant conduit 170 may be defined as an annulus between flocculant tube 173 and feed tube 31. During use, feed mixture and flocculant are pumped through tube 31 and the annulus defined between tubes 31 and 173, respectively, toward the feed chamber 76. As will be explained, in the example shown, feed mixture may be supplied into the feed chamber, while flocculant at least partially bypasses the feed chamber 76.

Referring to FIGS. 12 and 12A, the flocculant conduit 170 may be used to transfer flocculant to the sedimentation chamber 33 in a suitable fashion. Through the inlet 175 a flocculant solution may be pumped at a particular dosage rate to facilitate flocculating the product. The flocculant feed rate may be calculated at a specific weight of flocculant, for example kg/tonne, on a dry solids basis, which may be pre-determined by way of lab testing or other means. The outer column 173 may be shorter in length than the feed tube 31. The flocculant may exit the annulus 172 through one or more radial passageways. In the example shown, the flocculant exits annulus 172 through a suitable number, for example eight radial holes 177 near or at an axial end of the outer flocculant feed tube 173 assembly. The flocculant may pool in a flocculant collection zone 179, which may be an annulus defined between in an interior surface 50G of the conveyor body 50 and an exterior surface of the conduit 170. The flocculant collection zone 179 may have a sloped bottom, for example defined by interior surface 50G of conveyor body 50, for example sloped equal to the conical section angle of repose of a conveyance tube 171 to direct the flocculant. The feed zone end 170C of the collection zone 179 may comprise a baffle wall.

Referring to FIGS. 12 and 12A, a downstream portion of the flocculant conduit 170 may direct flocculant from the flocculant collection zone 179 to the sedimentation chamber 33. For example, the downstream portion may direct the flocculant toward the flight 60. The flocculant conduit 170 may comprise radial ports 178 in the conveyor body 50 that are supplied by the upstream portion 170A of the flocculant conduit 170. The downstream portion may comprise a plurality of axial tubes, such as conveyance tubes 171, that may direct the flocculant, for example supplied through ports 178, toward the flight 60 along the outer surface 50E of the conveyor body 50. The radial ports 178 may define openings to the conveyance tubes 171, which may form part of the flocculant conduit 170.

Referring to FIGS. 12 and 12A, the downstream portion of the conduit 170 may feed flocculant to the sedimentation chamber 30 in a suitable fashion. The flocculant conveyance tubes 171 may extend along a beach section 35 of the bowl 12 to a flocculant outlet 171A, for example a nozzle or plurality of nozzles, defined within the sedimentation chamber 33. The flocculant conveyance tubes 171 may be angled at the same angle as the base, for example the outer surface 50E, of the flocculant collection zone 179. Due to the gravitational forces applied to the flocculant by the spinning of the rotating assembly, the flocculant solution may travel down the flocculant conveyance tubes 171. The downstream portion may extend to the pond section 37 of the bowl 12. The flocculant conduit 170 may allow the flocculant to bypass the feed chamber 76. The conveyance tubes 171 may allow the flocculant to bypass and avoid interacting with the accelerator 80, feed nozzles, and redirection shrouds, if present. In the illustration provided, flocculant travels along upstream portion 170A, through the collection zone 179, and through flocculant conveyance tubes 171 travel along the conveyor body 50, towards the pond section 37, in the direction indicated by arrows 174. The flocculant outlet 171A of the conveyance tube 171 may discharge the flocculant adjacent to, for example at or near, the feed redirection nozzles 98. The addition of the flocculant adjacent to, for example in direction parallel to, the feed redirection nozzles 98 may allow the flocculant to avoid the high energy associated with the centrifugal acceleration action at the accelerator 80. In some cases the flocculant may enter the sedimentation chamber upstream of a baffle 60C of the flight 60.

Referring to FIGS. 12 and 12A, adding flocculant in bypass of the feed chamber may be advantageous over adding flocculant to the feed chamber with the feed mixture. A bypass feature may allow for the flocculant to be added directly into the pond section 37 of the centrifuge 10. The addition of the flocculant in such a manner may allow the flocculant to avoid centrifugal forces, which may otherwise result in shearing of the flocculant. A bypass feature may allow unsheared virgin flocculant direct access to the pond section 37 of the centrifuge 10 where it can interact with the suspended solids of the slurry and provide maximum settleability for the low specific gravity clay constituent of the feed slurry. This may provide for quicker settling and reduced flocculant usage to achieve the same results as adding flocculant to the product feed prior to the feed tube 22 in other applications. In the example shown, the feed mixture may be continuously processed within the centrifuge 10, and the flocculant may be supplied through a feed conduit 170 into the sedimentation chamber 33. In so doing the virgin polymer avoids the extremely high energy associated with the centrifugal acceleration action at the accelerator imparted to the incoming slurry. There is a high amount of shear imparted to the incoming slurry that may be counterproductive to the establishment and retention of long polymer carbon chains. This high amount of shear energy may otherwise damage or break the long carbon chains of the virgin polymer and shorten the chains thereby reducing the molecular weight of the floc. This bypass feature for the polymer may allow unsheared virgin polymer direct access to the decanter section of the RA where it can interact with the suspended solids of the slurry and provide maximum settleability for the low specific gravity clay constituent of the feed slurry. Such may provide for quicker settling and reduced polymer usage to achieve the same results as adding polymer to the product feed prior to the feed tube in other applications.

Figure 13:
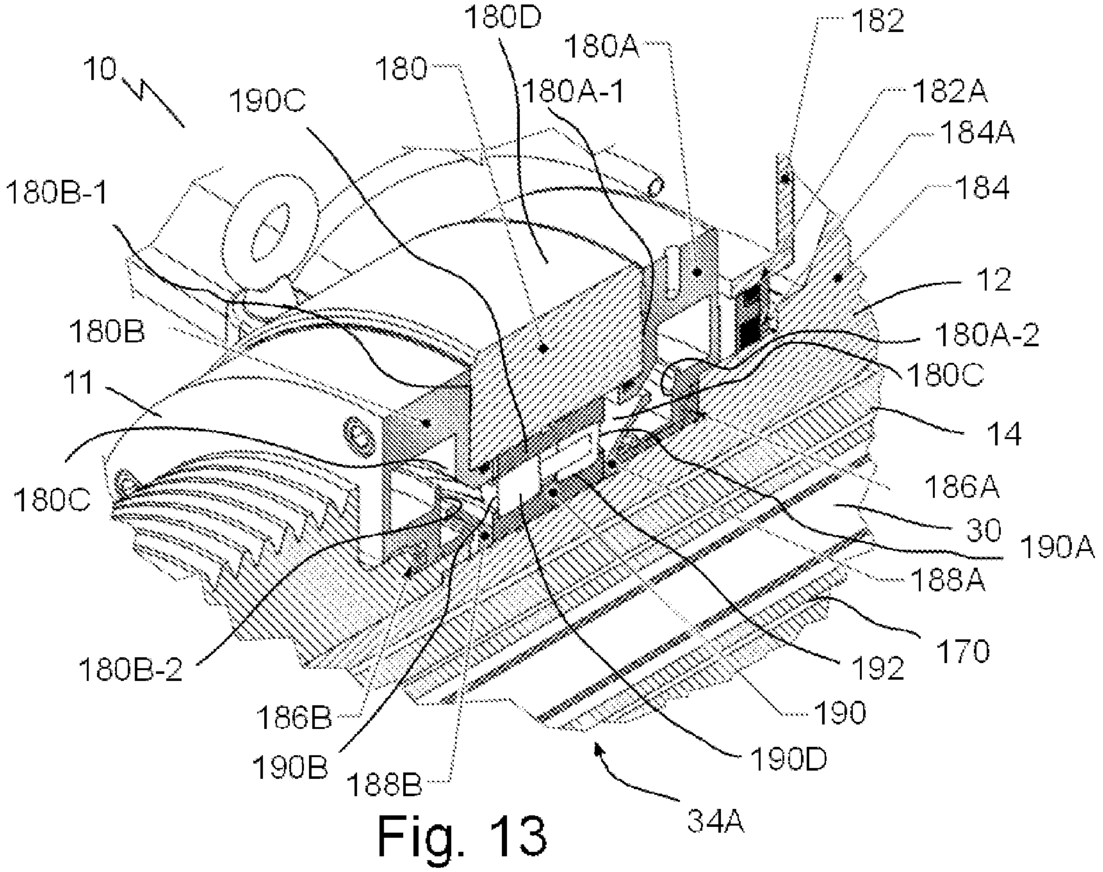
FIG. 13 is a cross-sectional view of an oil bath bearing system of a decanter centrifuge.

Referring to FIG. 13, an oil bath bearing assembly 192 may support one or more axial ends, such as ends 34 and/or 36 of the decanter centrifuge 10. A bearing assembly may minimize the friction between the moving parts, reducing the wear on the parts and lowering operating temperatures. Using an oil bath bearing assembly 192 may be advantageous over other bearing systems, such as grease bearings, providing relatively lowered friction, lowered operating temperature, and longer life. An oil bath bearing assembly 192 may comprise a bearing 190, which may include a race 190C and a roller element 190D, or in the example shown a plurality (for example two) sets of roller elements. The roller element may comprise any suitable roller element, such as a spherical roller. The bearing 190 may be any suitable bearing such as a double-row spherical roller bearing. A spherical roller bearing may be advantageous over other bearings, such as roller or thrust bearings, in that a roller bearing may be relatively more forgiving for misalignment issues. For example, a spherical roller bearing may permit several degrees of misalignment during operation, whereas a cylindrical or needle bearing may only permit up to a 1 of a degree. With more tolerance, the bearing, and hence the centrifuge, may be relatively less expensive to manufacture and assemble, and relatively less expensive to operate.

Referring to FIG. 13, the oil bath bearing assembly 192 may have a variety of suitable parts and features. The bearing 190 may be supported by a pillow block 180. One or more covers, such as an inboard pillow block cover 180A and an outboard pillow cover block 180B, may seal first and second axial ends 180A-1 and 180B-1, respectively, of the pillow block 180. Interior surfaces of the pillow block covers 180A and 180B and the pillow block 180 may define a bearing-receiving cavity 180C. The bearing 190 and a suitable bearing fluid may be disposed within the cavity 180C. The bearing fluid may be any suitable bearing fluid, such as a lubricating oil. The bearing 190 may be submerged within the bearing fluid contained within the cavity 180C.

Referring to FIG. 13, the bearing fluid may be supplied and/or circulated throughout the oil bath bearing assembly 192 by a suitable mechanism. One or more bearing fluid injectors (not shown) may be used to inject the bearing fluid. The bearing fluid injectors may comprise nozzles. The injectors may be arranged in a suitable fashion within the assembly 192, for example a series of injectors may be arrayed at least partially circumferentially about an inner annular surface 180A-2 and 180B-2 of one or both pillow block covers 180A and 180B, respectively. The injectors may be oriented to direct bearing fluid toward one or more axial ends, such as ends 190A and 190B, of the bearing 190. A bearing fluid supply system may be provided to supply and/or return bearing fluid, for example similar to a hydraulic fluid system. The bearing fluid supply system may permit the circulation of the bearing fluid. The bearing fluid supply system may include multiple drains (not shown), which may return bearing fluid from the bearing assembly 192. In some cases the drains may be located in pillow block 180, for example passing fluid out of block 180 via a series of drains oriented radially through the block 180, exiting an outer circumferential surface 180D of the block 180. During the circulation between the drains and the injector, the fluid may pass through a filter (not shown), ensuring that the fluid remains clean. The cleanliness of the fluid may extend the lifespan of the bearing 190, and may reduce the operating temperature of the bearing 190.

Referring to FIG. 13, the oil bath bearing assembly 192 may comprise one or more flinger rings, such as rings 188A and 188B, adjacent to one or more axial ends 190A and 190B, respectively, of the bearing 190. The retention of the fluid within the cavity 180C may be assisted by inboard flinger ring 188A and outboard flinger ring 188B. The flinger rings 188A, 188B may be structured to direct the fluid, such as oil, back towards the bearing 190. The flinger rings 188A and 188B may be sloped with decreasing radius in a direction toward the bearing 190 to direct bearing fluid toward the bearing 190. One or more flinger rings may keep the oil redirected to the bearing, for example to retain oil in the bearing at least one revolution before it drains out of the bottom of the pillow block cover.

Referring to FIG. 13, the bearing assembly 192 may be sealed by a suitable mechanism. The cavity 180C may be sealed by a suitable seal to prevent the fluid from leaking. There may be an outboard and inboard seal present, to ensure that both axial ends of the cavity 180C are sealed. The seals may be any suitable seal, such as an inboard labyrinth seal 186A or an outboard labyrinth seal 186B. The block 180, covers 180A, 180B and the cavity 180C, may be captured by a hub 184 and a lid 182 system. The hub 184 may be sealed by a suitable seal such as a hub seal 184A. The lid 182 may be sealed by a suitable seal such as a lid seal 182A. The hub 184 and lid 182 may allow the bearing 190 to be isolated from the processing material and process within the centrifuge 10. The isolation of bearing 190 may allow the bearing 190 to remain cleaner than if the bearing 190 was not isolated. Ensuring that the bearing 190 is clean may allow for an increased life span of the bearing 190, and a decreased temperature of the bearing during operation. The bearing assembly 192 may be pressurized, and the seals used may be rated for such operating pressures.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A decanter centrifuge comprising:

a bowl forming a sedimentation chamber with a cake discharge and a centrate discharge;

a screw conveyor within the sedimentation chamber, the screw conveyor having a conveyor body and a flight, the conveyor body defining a feed chamber and forming an enclosed shell with radial ports between the feed chamber to the sedimentation chamber; and an accelerator within the feed chamber for increasing the angular velocity of a feed mixture prior to entering the sedimentation chamber via the radial ports, the accelerator comprising an impeller with plural vanes, the plural vanes being releasably mounted to the conveyor body and sized to pass through an axial end of the conveyor body;

in which:

the plural vanes are formed on a disc part that has a maximum outer diameter smaller than a minimum inner diameter of the axial end of the conveyor body, in which the conveyor body defines a bearing unit mount at the axial end for removably receiving a bearing unit; and the disc part is mounted to or forms an accelerator base of the accelerator.

2. The decanter centrifuge of claim 1 in which the axial end of the conveyor body is a first axial end opposite an axial feed end of the conveyor body, the axial feed end comprising or defining a feed conduit into the feed chamber.

3. The decanter centrifuge of claim 1 in which the disc part is adhered to the accelerator base.

4. The decanter centrifuge of claim 1 in which:

the plural vanes are releasably mounted by fasteners that are accessible from an exterior of the conveyor body; and the accelerator mounts within an outer collar body of the conveyor body.

5. The decanter centrifuge of claim 4 in which the fasteners extend through radial bores from an outer surface of the outer collar body to engage an outer surface of the accelerator.

6. The decanter centrifuge of claim 4 in which the fasteners engage a circumferential groove in the outer surface of the accelerator.

7. The decanter centrifuge of claim 1 in which the plural vanes are forwardly curved.

8. The decanter centrifuge of claim 1 further comprising:

a feed conduit connected to supply a feed mixture of solids and liquids to the feed chamber formed within the conveyor body;

radial feed redirection nozzles that are structured to direct the feed mixture from the feed chamber, through radial ports in the conveyor body, and toward the flight along an outer surface of the conveyor body; and wear liners in the radial ports.

9. The decanter centrifuge of claim 1 comprising a feed zone liner within the feed chamber upstream of the accelerator, in which:

a ring part that defines an axial feed port to direct feed to the plural vanes of the accelerator; and the ring part comprises guide fins arrayed about the axial feed port.

10. The decanter centrifuge of claim 9 in which the axial end of the conveyor body is a first axial end opposite an axial feed end of the conveyor body, and the feed zone liner is releasably mounted to the conveyor body and sized to pass through the first axial end or the second axial end of the conveyor body.

11. The decanter centrifuge of claim 10 in which the feed zone liner defines a maximum outer diameter smaller than a minimum inner diameter of the axial end of the conveyor body.

12. The decanter centrifuge of claim 11 in which:

the feed zone liner is releasably mounted by fasteners that are accessible from an exterior of the conveyor body; and the feed zone liner mounts within an outer collar body of the conveyor body.

13. The decanter centrifuge of claim 12 in which the fasteners extend through radial bores from an outer surface of the outer collar body to engage an outer surface of the feed zone liner.

14. The decanter centrifuge of claim 12 in which the fasteners engage a circumferential groove in the outer surface of the feed zone liner.

15. The decanter centrifuge of claim 1 further comprising a flocculant conduit structured to supply a flocculant to the sedimentation chamber.

16. The decanter centrifuge of claim 1 further comprising an oil bath bearing assembly supporting one or more axial ends of the decanter centrifuge in which:

the oil bath bearing assembly comprises a bearing that has a race and a roller element;

the roller element comprises a spherical roller; and the bearing is a double-row spherical roller bearing.

17. The decanter centrifuge of claim 16 further comprising:

a pillow block supporting the bearing;

pillow block covers sealing first and second axial ends of the pillow block, in which interior surfaces of the pillow block covers and the pillow block define a bearing-receiving cavity in which the bearing and a bearing fluid are disposed; and a bearing fluid injector connected to a bearing fluid supply system.

18. The decanter centrifuge of claim 17 in which the bearing fluid injector comprises nozzles arranged at least partially circumferentially about an inner annular surface of one or both pillow block covers and oriented to direct bearing fluid toward an axial end of the bearing.

19. The decanter centrifuge of claim 17 in which the oil bath bearing assembly comprises one or more flinger rings adjacent one or more axial ends of the bearing and sloped with decreasing radius in a direction toward the bearing to direct bearing fluid toward the bearing.

20. The decanter centrifuge of claim 1 in which the feed mixture comprising mature fine tailings produced from an oil sands process.

* * * * *